(12) United States Patent
Stokes et al.

(10) Patent No.: US 8,783,736 B2
(45) Date of Patent: Jul. 22, 2014

(54) QUICK CONNECTOR FOR FAUCET

(75) Inventors: Andrew J. Stokes, Sheboygan, WI (US); Ryan F. Leichty, Sheboygan, WI (US); Gregory R. Schmidt, Port Washington, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 13/554,802

(22) Filed: Jul. 20, 2012

(65) Prior Publication Data

US 2013/0020794 A1    Jan. 24, 2013

Related U.S. Application Data

(60) Provisional application No. 61/510,332, filed on Jul. 21, 2011.

(51) Int. Cl.
*F16L 21/00*    (2006.01)

(52) U.S. Cl.
USPC ......... 285/402; 285/401; 285/376; 285/124.1

(58) Field of Classification Search
USPC .............. 285/402, 401, 400, 377, 376, 124.1, 285/124.4; 137/801, 603
See application file for complete search history.

(56) References Cited

U.S. PATENT DOCUMENTS

| | | | | |
|---|---|---|---|---|
| 3,625,251 A | * | 12/1971 | Nelson | 137/614.04 |
| 4,066,129 A | * | 1/1978 | Anderson | 285/402 |
| 4,313,626 A | * | 2/1982 | Duncan | 285/402 |
| 4,527,745 A | * | 7/1985 | Butterfield et al. | 285/402 |
| 4,758,023 A | * | 7/1988 | Vermillion | 285/401 |
| 4,869,534 A | | 9/1989 | Ketcham et al. | |
| 5,020,569 A | * | 6/1991 | Agresta | 137/801 |
| 5,024,419 A | | 6/1991 | Mulvey | |
| 5,104,158 A | | 4/1992 | Meyer et al. | |
| 5,330,235 A | | 7/1994 | Wagner et al. | |
| 5,361,431 A | | 11/1994 | Freier et al. | |
| 5,397,196 A | * | 3/1995 | Boiret et al. | 285/402 |
| 5,462,313 A | | 10/1995 | Rea et al. | |
| 5,542,717 A | | 8/1996 | Rea et al. | |
| 5,573,279 A | | 11/1996 | Rea et al. | |
| 5,586,792 A | | 12/1996 | Kalahasthy et al. | |
| 5,624,073 A | | 4/1997 | Mueller et al. | |
| 5,685,341 A | | 11/1997 | Chrysler et al. | |
| 5,741,084 A | * | 4/1998 | Del Rio et al. | 285/402 |
| 5,865,474 A | * | 2/1999 | Takahashi | 285/124.1 |
| 5,875,976 A | * | 3/1999 | Nelson et al. | 285/401 |
| 5,946,746 A | | 9/1999 | Bloom | |

(Continued)

OTHER PUBLICATIONS

International Search Report and Written Opinion for PCT/US2012/047679, mail date Dec. 13, 2012, 8 pages.

(Continued)

*Primary Examiner* — David E Bochna
(74) *Attorney, Agent, or Firm* — Foley & Lardner LLP

(57) ABSTRACT

A quick connector assembly for a faucet is provided. The quick connector assembly includes a hose fitting having a longitudinal axis, a lock tab coupled to the hose fitting and having at least one projection extending radially therefrom, and a connector body having at least one slot extending from an opening to a locked position, the at least one slot configured to receive the at least one projection of the lock tab. Moving the projection of the lock tab from the opening of the slot to the locked position connects the lock tab to the connector body.

19 Claims, 24 Drawing Sheets

(56) References Cited

U.S. PATENT DOCUMENTS

| | | | |
|---|---|---|---|
| 6,085,784 A | 7/2000 | Bloom et al. | |
| 6,398,136 B1* | 6/2002 | Smith | 285/401 |
| 6,631,730 B1 | 10/2003 | Bloom et al. | |
| 6,672,628 B2 | 1/2004 | Thomas et al. | |
| 6,684,906 B2 | 2/2004 | Burns et al. | |
| 6,725,472 B2 | 4/2004 | Gray et al. | |
| 6,877,778 B2* | 4/2005 | Froment et al. | 285/402 |
| 7,231,936 B2* | 6/2007 | Chang | 137/801 |
| 7,270,348 B2 | 9/2007 | Parrott | |
| 7,270,350 B2 | 9/2007 | Cronley | |
| 7,469,880 B2 | 12/2008 | Green et al. | |
| 7,484,769 B2* | 2/2009 | Domash et al. | 285/124.4 |
| 7,490,372 B2* | 2/2009 | Huang | 285/402 |
| 7,651,138 B2 | 1/2010 | Feger et al. | |
| 7,658,202 B2 | 2/2010 | Mueller et al. | |
| 8,052,780 B2 | 11/2011 | Rotter et al. | |
| 8,096,488 B2* | 1/2012 | Mueller | 239/289 |
| 8,136,844 B1* | 3/2012 | Liu | 285/124.1 |
| 8,215,334 B2 | 7/2012 | Esche et al. | |
| 8,302,620 B2* | 11/2012 | Lin | 137/801 |
| 8,439,077 B2* | 5/2013 | Wu | 137/801 |
| 2004/0173515 A1 | 9/2004 | Nakanishi et al. | |
| 2011/0073205 A1* | 3/2011 | Marty et al. | 137/801 |

OTHER PUBLICATIONS

International Preliminary Report on Patentability and Written Opinion for Application No. PCT/US2012/047679, mail date Jan. 30, 2014, 6 pages.

* cited by examiner

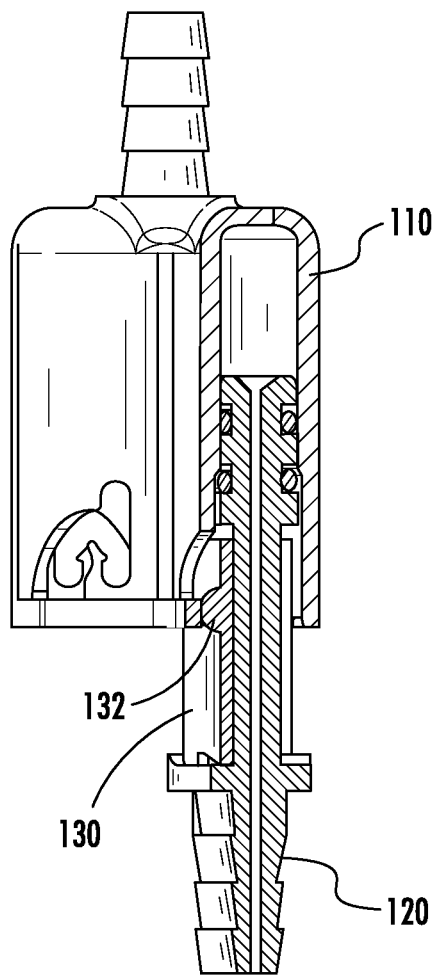# 
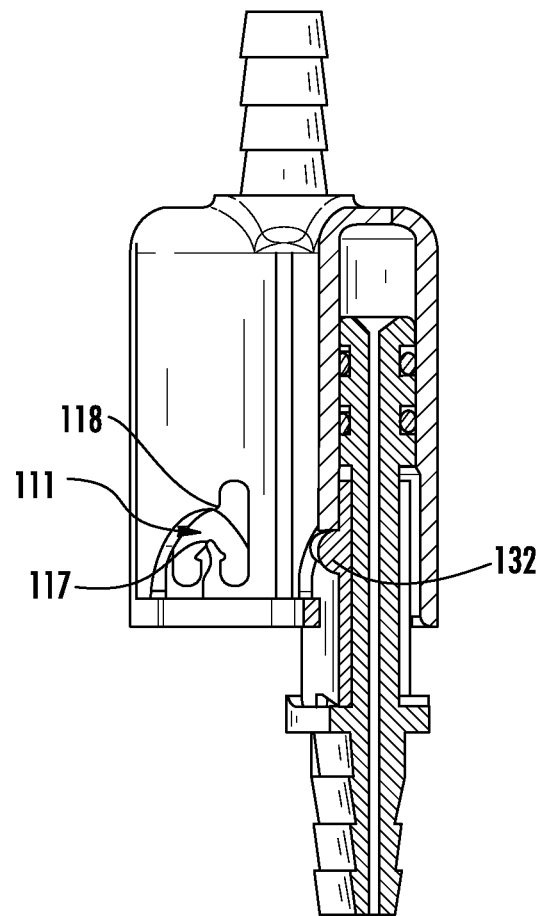
FIG. 4
FIG. 5

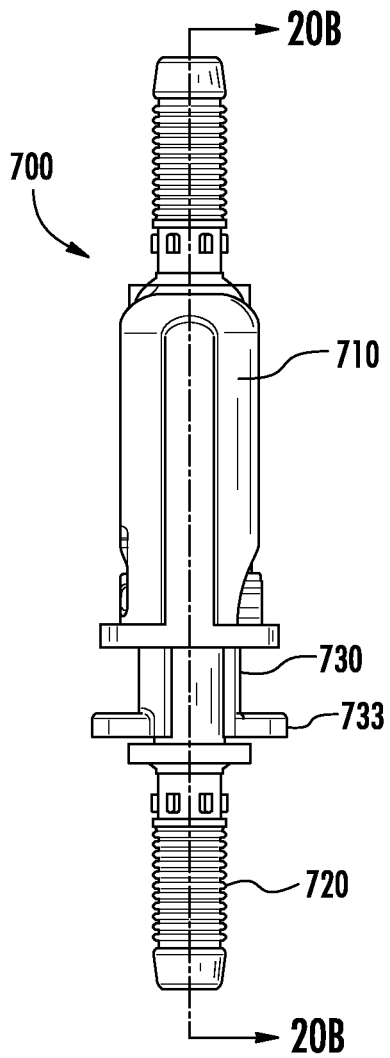
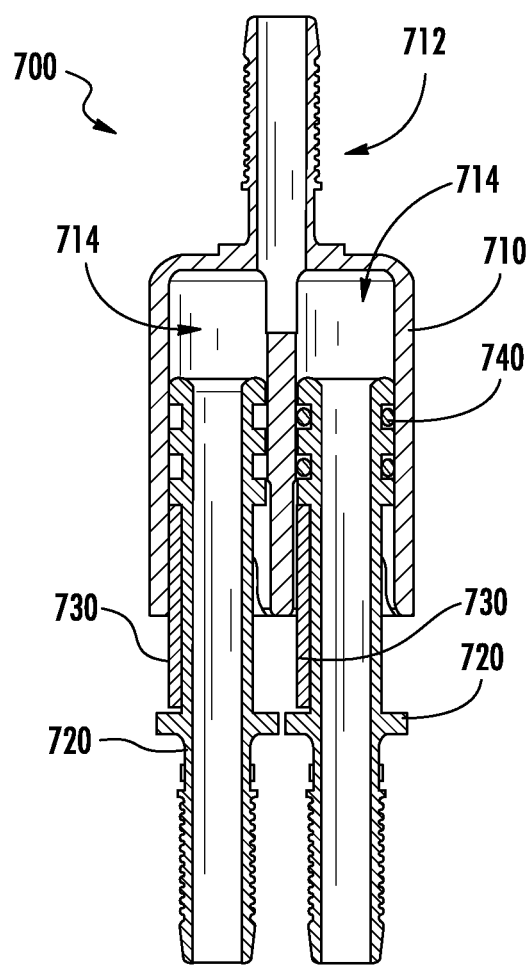
FIG. 20A
FIG. 20B

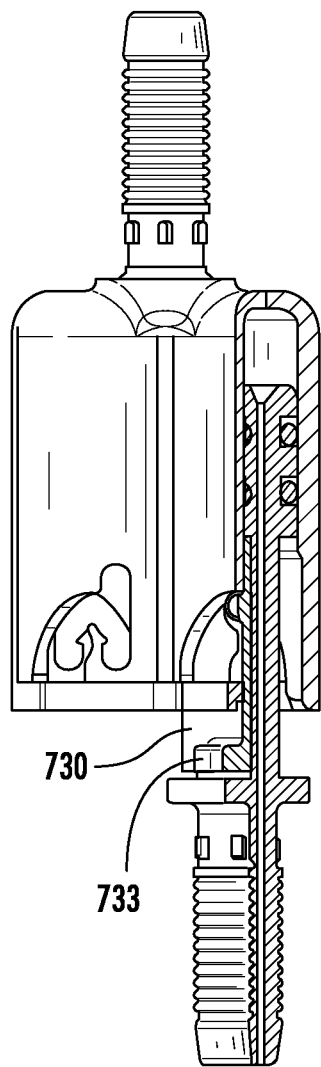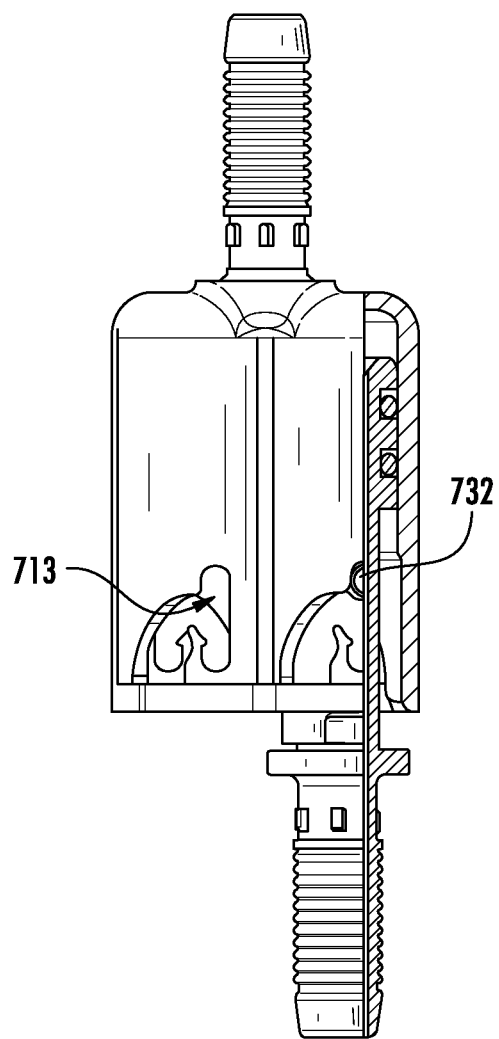
FIG. 24
FIG. 25

QUICK CONNECTOR FOR FAUCET

CROSS-REFERENCE TO RELATED PATENT APPLICATIONS

This application claims priority to U.S. Provisional Patent Application No. 61/510,332, titled "Quick Connector for Faucet," filed Jul. 21, 2011, incorporated herein by reference in its entirety.

BACKGROUND

Faucets include connectors to provide a connection for supply hoses which provide hot and cold water to the faucet. Conventional connectors for a faucet typically include machined metal parts, such as connectors made of machined brass. Such metal connectors typically include a threaded connection to screw the connector onto a threaded connection of a metal shank of a spout, such as a brass shank which provides a brass on brass connection. An example of such a connection is a brass on a brass cone connection. These conventional connectors can further include a flat rubber washer and a flat plastic washer to assist in sealing the connection.

An issue with the conventional connectors is that it can be difficult to form a seal with the connector. Such conventional connectors can require a particular arrangement or order for assembling washers on the connector. This particular order is not common knowledge to the average end customer. As a result, the connector is often used improperly, which causes leaks and customer dissatisfaction with the connector. In addition, the connector has a relatively high cost, which can result from its machined metal parts.

SUMMARY

One embodiment relates to a quick connector assembly for a faucet. The quick connector assembly includes a hose fitting having a longitudinal axis, a lock tab coupled to the hose fitting and having at least one projection extending radially therefrom, and a connector body having at least one slot extending from an opening to a locked position, the at least one slot configured to receive the at least one projection of the lock tab. Moving the projection of the lock tab from the opening of the slot to the locked position connects the lock tab to the connector body.

Another embodiment relates to a quick connector assembly for a faucet. The quick connector assembly includes a lock tab coupled to a hose fitting. The lock tab includes a longitudinal axis and a projection extending radially from the lock tab. The quick connector assembly further includes a connector body having at least one slot extending from an opening to a locked position, the at least one slot having gate portion which resists the passage of the projection therethrough configured to receive the at least one projection of the lock tab. Moving the projection of the lock tab from the opening of the slot to the locked position connects the lock tab to the connector body.

Another embodiment relates to a faucet including a quick connector assembly. The quick connector assembly includes a hose fitting having a longitudinal axis, a lock tab coupled to the hose fitting and having at least one projection extending radially therefrom, and a connector body having at least one slot extending from an opening to a locked position, the at least one slot configured to receive the at least one projection of the lock tab. Moving the projection of the lock tab from the opening of the slot to the locked position connects the lock tab to the connector body.

The foregoing is a summary and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 4 is a cross-sectional view of an exemplary embodiment of the quick connector assembly of FIG. 1 after a hose fitting has been initially inserted into a quick connector.

FIG. 5 is a cross-sectional view of an exemplary embodiment of the quick connector assembly of FIG. 1 after a hose fitting has been further inserted into a quick connector.

FIG. 20A is a side view of an exemplary embodiment of the quick connector assembly of FIG. 19.

FIG. 20B is a cross-sectional view of the quick connector assembly of FIG. 20A along line B-B.

FIG. 24 is a cross-sectional view of an exemplary embodiment of the quick connector assembly of FIG. 19 after a hose fitting has been partially rotated relative to a quick connector.

FIG. 25 is a cross-sectional view of an exemplary embodiment of the quick connector assembly of FIG. 19 after a hose fitting has been fully rotated relative to a quick connector.

DETAILED DESCRIPTION

According to an exemplary embodiment, a quick connector and quick connector assembly for a faucet are disclosed herein that may advantageously be relatively easy to use and install. Such quick connector and quick connector assembly is intended to reliably and easily provide a desired seal for a faucet. The quick connector also advantageously is less costly and requires fewer parts than other common connector systems used in the industry.

Figure 1A:
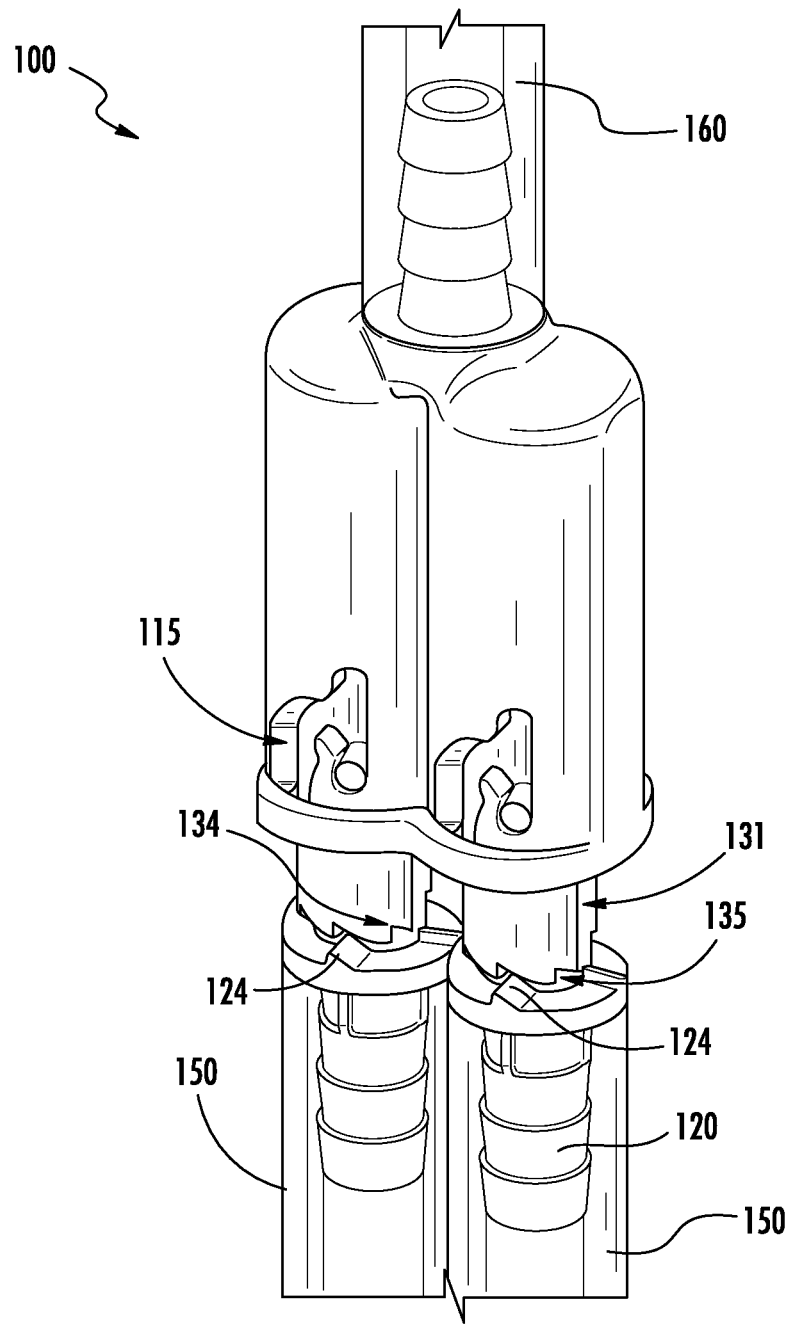
FIG. 1A is perspective view of an exemplary embodiment of a quick connector assembly with attached hoses shown transparently.
Figure 1B:
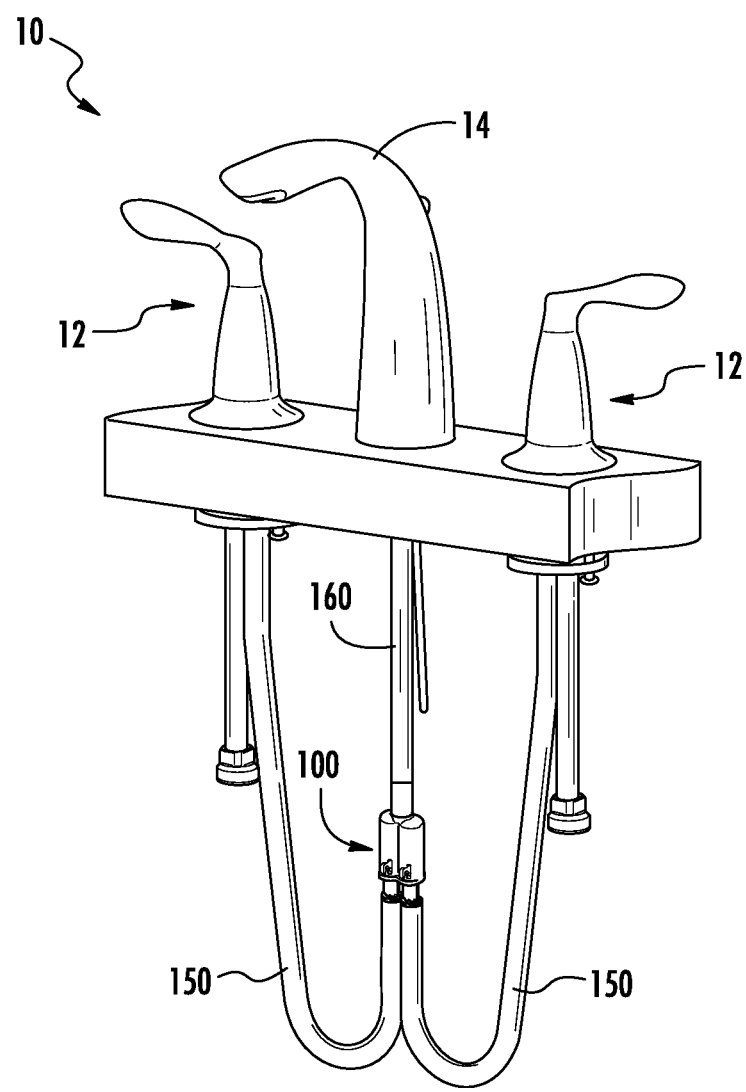
FIG. 1B is a perspective view of an exemplary embodiment of a faucet including a quick connector assembly.
Figure 1C:
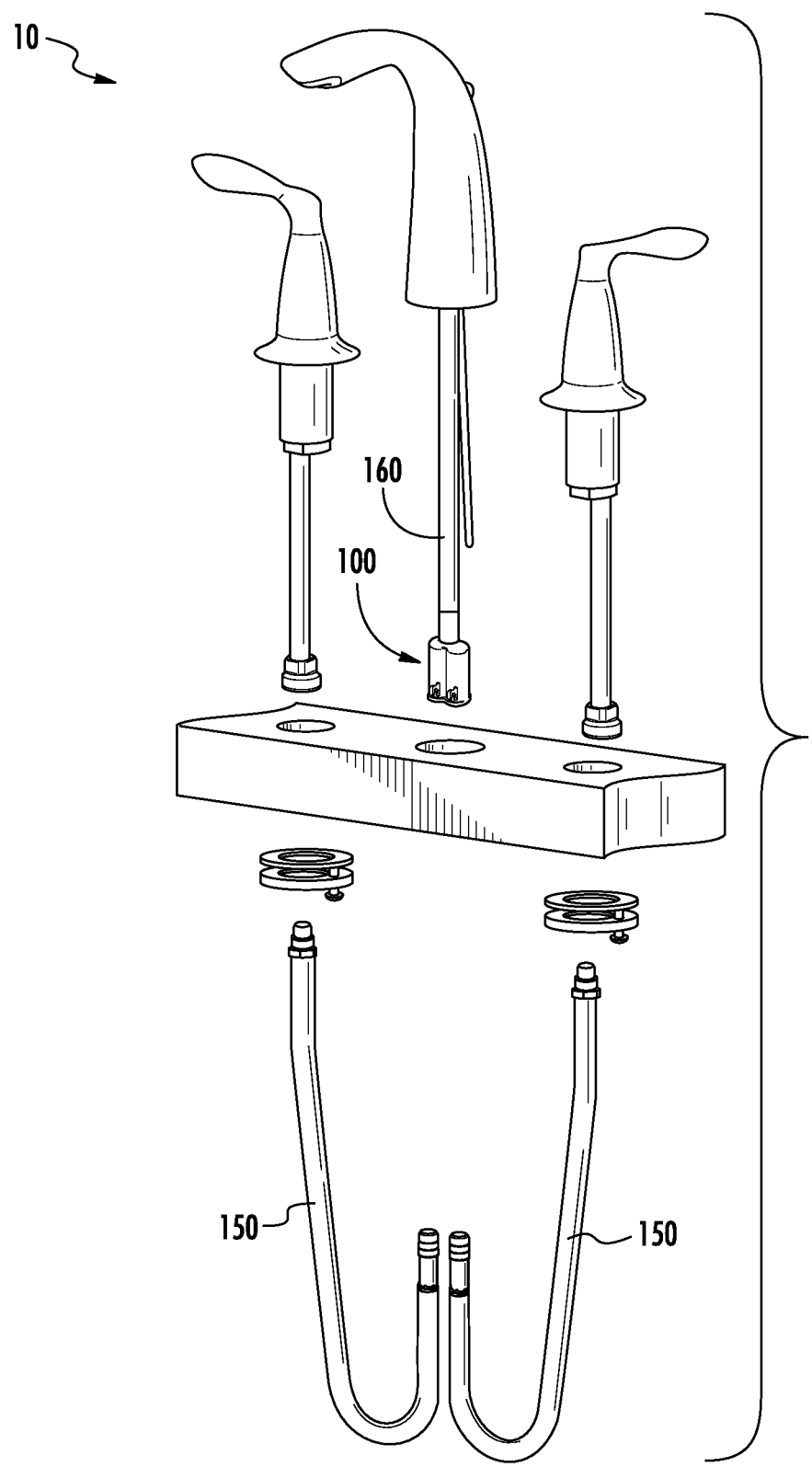
FIG. 1C is an exploded view of the faucet of FIG. 1B.

FIG. 1A is a perspective view of an exemplary quick connector assembly 100 for a faucet, with supply hoses 150 attached to the assembly 100. The supply hoses 150 are provided to supply hot and cold water to a faucet, such as through a hose 160 which supplies the water from the assembly 100 to a faucet (not shown). For example, one of the hoses 150 can be connected to a hot water source to supply hot water and the other of the hoses 150 can be connected to a cold water source. FIGS. 1B and 1C show an exemplary embodiment of a faucet 10, which can include a quick connector assembly 100 according to the embodiments described herein. As shown in the example of FIGS. 1B and 1C, a quick connector assembly 100 can be connected to supply hoses 150, which are in turn connected to the valves 12 of the faucet 10 through which hot and cold water flow. The quick connector assembly 100 can also be connected to the outlet 14 of the faucet 10 via the hose 160.

Figure 2A:
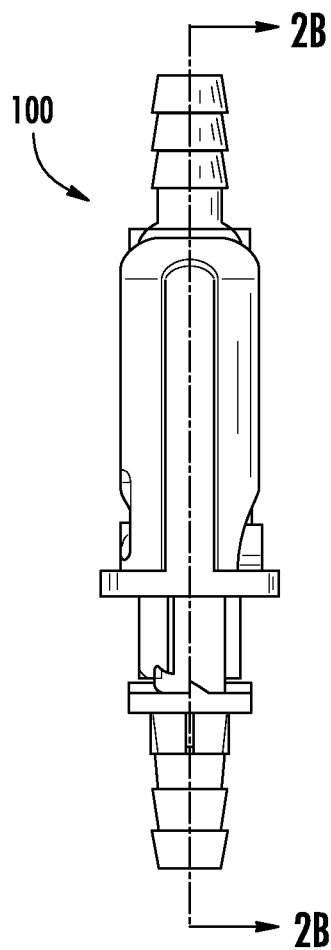
FIG. 2A is a side view of an exemplary embodiment of the quick connector assembly of FIG. 1.
Figure 2B:
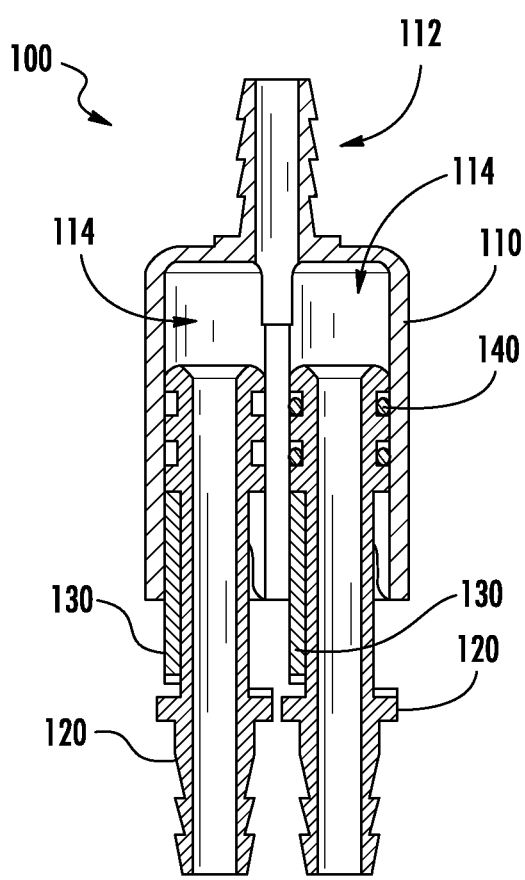
FIG. 2B is a cross-sectional view of the quick connector assembly of FIG. 2A along line B-B.

FIG. 2A shows a side view of an exemplary embodiment of a quick connector assembly 100, with FIG. 2B showing a cross-sectional view of the quick connector assembly 100 of FIG. 2A along line B-B. As shown in FIG. 2B, a quick connector assembly 100 can include a quick connector 110 (e.g., a tee, connector body, etc.) and hose connectors or fittings 120. A hose fitting 120 can be provided for each of the hot and cold water supply hoses 150 to be connected to the quick connector assembly 100. The quick connector 110 also includes a fitting 112 to connect the hose 160 supplying water to a faucet, such as a barbed fitting.

Figure 3:
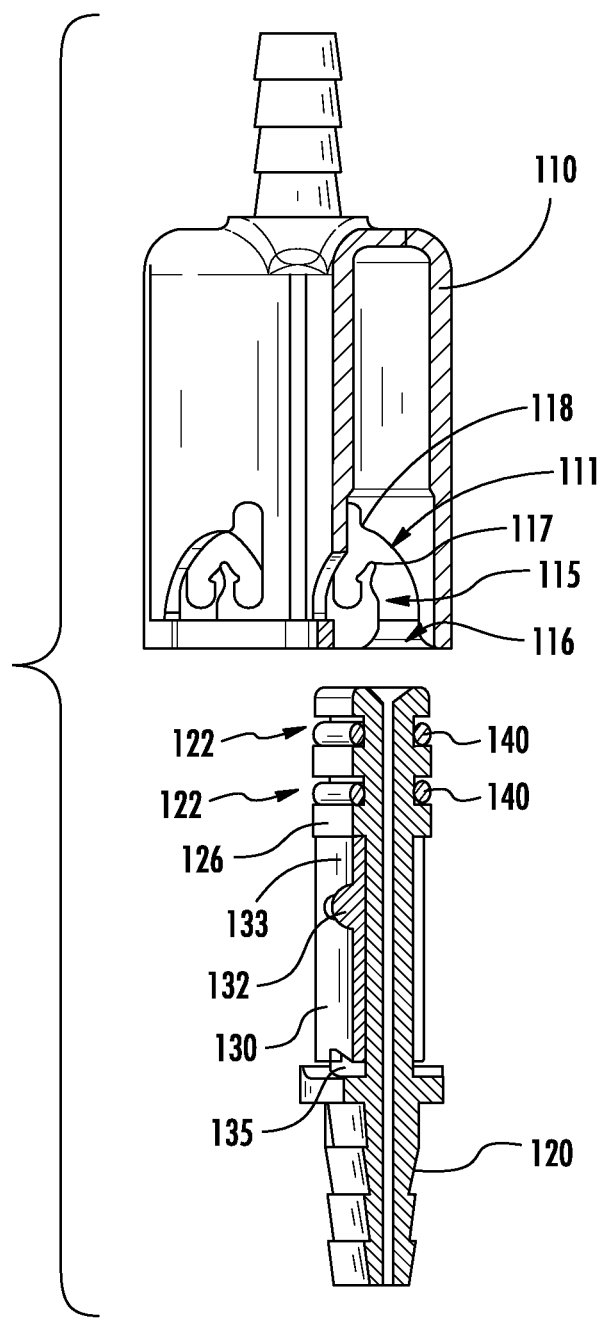
FIG. 3 is a cross-sectional view of an exemplary embodiment of the quick connector assembly of FIG. 1 before a hose fitting has been inserted into a quick connector.

The quick connector assembly 100 further includes a lock device or hose lock tab 130. As shown in FIG. 2B, a hose lock tab 130 can be provided for each hose fitting 120 of the quick connector assembly 100. The hose lock tab 130 engages with a hose fitting 120 to restrict axial movement between the hose lock tab 130 and the hose fitting 120 in at least one direction, such as by providing the hose fitting 120 with a shoulder 126 which engages with an end 133 of the hose lock tab 130, as shown in FIG. 3 according to an exemplary embodiment.

The hose lock tab 130 can have a substantially cylindrical shape with a gap 131 so that the hose lock tab 130 can be fitted onto a hose fitting 120, such as by passing the hose fitting 120 through the gap 131. As a result, the hose lock tab 130 can be snapped or fitted onto an exterior of a hose fitting 120, as shown in FIG. 1A according to an exemplary embodiment.

For example, a hose lock tab 130 can have a substantially cylindrical shape with a gap extending along its longitudinal axis so that the hose lock tab 130 has a cross-section with a substantially circular shape except that cross-section does not form a complete circle due to the gap. According to another example, the hose lock tab 130 can have a substantially cylindrical shape with a cross-section having a substantially circular shape through about 270° of an arc due to the gap of the hose lock tab 130.

According to an exemplary embodiment, the quick connector 110 is made of a polymeric material. For example, the quick connector 110 can be a plastic molded part. Other parts and components of the quick connector assembly 100 can be made of polymeric materials, such as, for example, the hose fittings 120 and the hose lock tab 130. The quick connector 110 can be sized and configured to fit into a faucet. For example, the quick connector 110 can be sized and configured to fit through a one inch hole in a deck of a faucet.

The quick connector 110 includes a main body that may be formed as a single piece or as a number of separate pieces that are joined together. The main body of the quick connector 110 can include a cavity 114 to receive a hose fitting 120, as shown in FIG. 2B. Such a cavity 114 can have a shape substantially conforming to the exterior shape of a hose fitting 120, such as a substantially cylindrical shape, and a cavity 114 can be provided for each hose fitting 120.

A wall of the main body of the quick connector 110 forming the cavity can form a seal with a hose fitting 120 once the hose fitting 120 has been inserted into a cavity of the quick connector 110. The quick connector assembly 100 can include a device to assist in forming a seal between components of the quick connector assembly 100, such as between the quick connector 110 and a hose fitting 120. For example, one or more o-rings 140 can be provided on the hose fitting to assist in forming a seal between the quick connector 110 and a hose fitting 120. According to an exemplary embodiment, one o-ring 140 can be provided on a hose fitting 120. According to another exemplary embodiment, two o-rings 140 can be provided on a hose fitting 120, as shown in FIG. 2B. The use of two o-rings in place of a flat washer seal can improve the reliability of forming a seal and thus improve the quality of the quick connector assembly. A hose fitting 120 can include a groove 122 to receive an o-ring 140 and the hose fitting 120 can include a groove 122 for each o-ring 140, as shown in FIG. 3.

The hose lock tab 130 is intended to maintain the position of the hose fitting 120 within the quick connector 110 once the hose fitting 120 has been inserted into the quick connector 110. For example, the hose lock tab 130 can include a connection device or structure which engages with a corresponding connection device or structure of the quick connector 110 to maintain or lock the hose fitting 120 within the quick connector 110 to provide an assembly, as shown in FIG. 2B.

According to an exemplary embodiment, the connection devices or structures of the quick connector 110 and the hose lock tab 130 can provide a connection that prevents or otherwise resists rotation of the hose lock tab 130 once the hose lock tab 130 has been locked in place within the quick connector 110. Such a prevention or resistance to rotation can advantageously prevent the hose lock tab 130 and a hose fitting 120 connected to the hose lock tab 130 from being inadvertently disconnected from the quick connector 110. The hose lock tab 130 can engage with the quick connector 110 so that a push-pull movement is required to install a hose fitting 120 to a quick connector 110 and/or to disconnect the hose fitting 120 from the quick connector 110. Such a push-pull movement can be substantially along a longitudinal axis of the quick connector 110.

The connection between the quick connector 110 and the hose lock tab 130 can further require a rotation of the hose lock tab 130 in addition to a push-pull movement to secure the lock tab 130 and a corresponding hose fitting 120 into a locked position, such as by rotating the hose fitting 120 about its longitudinal axis. Such a rotation movement can also be required to disconnect a hose fitting 120 and lock tab 130 from the quick connector 110. According to another example, a second push-pull movement may be required to install or disconnect a hose fitting 120, such as by first pushing or pulling the hose fitting 120 in a first direction, then rotating the hose fitting 120 relative to the quick connector 110, and then pushing or pulling the hose fitting 120 in a second direction different from the first direction, such as an opposite direction.

At least one of the lock tab 130 and the hose fitting 120 can include a structure to assist the rotation of the lock tab 130 with the hose fitting 120 or vice versa when a rotational force is applied to at least one of the lock tab 130 and the hose fitting 120. For example, a lock tab 130 can include notches 134 and a hose fitting 120 can include lugs 124, as shown in FIG. 1A. Such notches 134 and lugs 124 can be initially spaced apart so there is a gap 135 between the notches 134 and lugs 124, as shown in FIGS. 1 and 3. Such a gap 135 advantageously permits a hose fitting 120 to rotate relative to a lock tab 130 and/or the quick connector 110, which prevents or minimizes kinking of a hose 150 attached to the hose fitting 120.

A push-pull force or movement can be exerted on the hose fitting 120 and the lock tab 130 to cause the hose fitting 120 and the lock tab 130 to move relative to one another so that the lugs 124 and the notches 134 engage. Once the lugs 124 and notches 134 are engaged they can provide a ratchet type of interaction that assists in the rotation of the lock tab 130 and the hose fitting 120 by applying a rotational force to either of the lock tab 130 and the hose fitting 120, which in turn causes the other of the lock tab 130 and the hose fitting 120 to rotate due to the engagement between the lugs 124 and the notches 134.

FIG. 3 shows an exemplary embodiment of a quick connector 110 and a hose fitting 120 with an attached hose lock tab 130 before the hose fitting 120 and hose lock tab 130 have been inserted into the quick connector 110 to install the hose fitting 120 within the quick connector 110. As shown in FIG. 3, the hose lock tab 130 can include a projection 132 as a connection device or structure and the quick connector 110 can include a slot 115 as a connection device or structure which engages with the projection 132 of the hose lock tab 130. According to an exemplary embodiment, the hose lock tab 130 can include one or more lugs or projections 132 and the quick connector 110 can include one or more slots 115 to correspond to each projection 132. At least a portion of a slot 115 can extend fully through a sidewall of the quick connector 110, as shown in FIG. 1A, so that a user may visually inspect the location of a projection 132 which has been inserted into the slot 115.

According to an exemplary embodiment, the slot 115 can have a hook shape to assist in retaining a projection 132 within the slot (see, e.g., FIGS. 1 and 3).

According to an exemplary embodiment, the slot 115 of the quick connector 110 includes an opening 116, and a projection 132 of a lock tab 130 may be aligned for insertion of the projection 132 into the slot 115 and insertion of the lock tab 130 and a hose fitting 120 into the quick connector 110. FIG. 4 shows a cross-sectional view of hose fitting 120 and lock tab 130 once a projection 132 of the lock tab 130 has been aligned with the opening 116 to initially insert the lock tab 130 and the hose fitting 120 into a quick connector 110.

FIG. 5 shows an exemplary embodiment of a lock tab 130 and hose fitting 120 after they have been inserted into the quick connector 110 so that the projection 132 of the lock tab 130 reaches a gate portion 111 of the slot 115. Such a gate portion 111 can be an opening for the projection 132 to enter a location where the projection is locked into place. As shown in FIGS. 3 and 5, the gate portion 111 can be formed by projections 117, 118. Such projections 117, 118 can form a gate portion 111 that requires a force to be exerted so that the projection 132 may pass through the gate portion 111, such as by providing a gate portion 111 with an opening that is slightly smaller than a diameter or width of the projection 132. For example, the projection 117 can be formed by a relatively narrow tab having a degree of flexibility so that the projection 117 will elastically deform and permit a projection 132 to pass through the gate portion 111 once a sufficient force has been applied.

Figure 6:
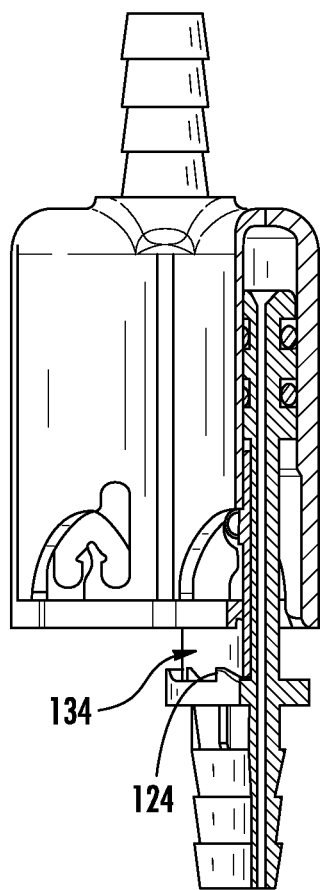
FIG. 6 is a cross-sectional view of an exemplary embodiment of the quick connector assembly of FIG. 1 after a hose fitting has been partially rotated relative to a quick connector.

The gate portion 111 can also serve as an anti-backout feature which resists uninstalling the hose fitting 120 from the quick connector 110 by resisting movement of the projection 132 through the gate portion 111 in a reverse direction after the projection 132 has passed through the gate portion 111 to be installed. For example, a rotational force may be applied to the lock tab 130 to pass the projection 132 through the gate portion 111. To assist such a rotation, the hose fitting 120 may be pushed upwards relative to the lock tab 130 to cause the lugs 124 of the hose fitting 120 to engage the notches 134 of the lock tab 130, as shown in FIG. 6, so that when a rotational force is applied to one of the hose fitting 120 and the lock tab 130, the other of the hose fitting 120 and the lock tab 130 also rotates.

Figure 7:
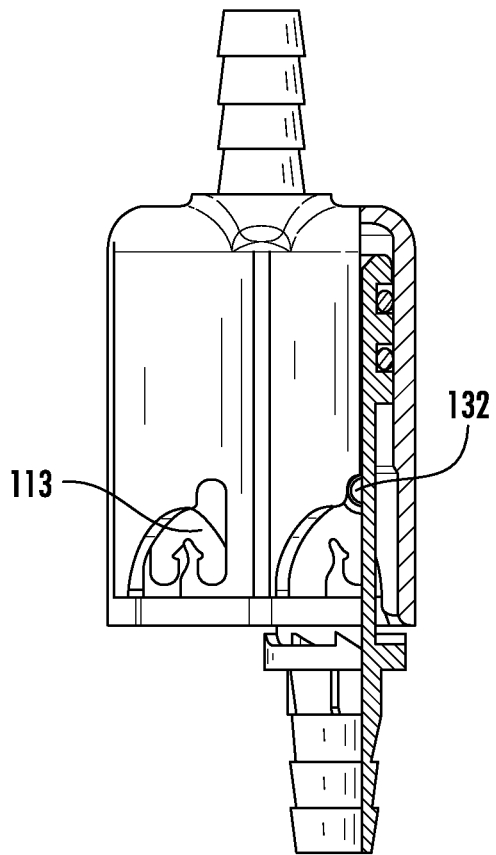
FIG. 7 is a cross-sectional view of an exemplary embodiment of the quick connector assembly of FIG. 1 after a hose fitting has been fully rotated relative to a quick connector.
Figure 8:
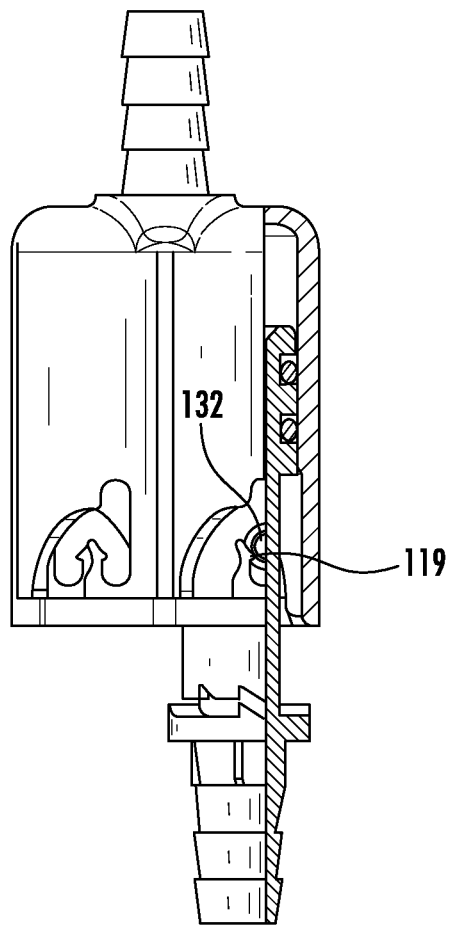
FIG. 8 is a cross-sectional view of an exemplary embodiment of the quick connector assembly of FIG. 1 after a hose fitting has been partially retracted from the quick connector towards a lock position.

FIG. 7 shows an exemplary embodiment of a hose fitting 120 and lock tab 130 after they have been rotated relative to a quick connector 110 so that a projection 132 of the lock tab 130 has been forced through the gate portion 111 to enter a channel 113. Once the projection 132 has entered the channel 113, the hose fitting 120 and the lock tab 130 can be pulled downwards in a direction to partially retract the hose fitting 120 and the lock tab 130 from the quick connect 110, as shown in FIG. 8, so that the projection can be moved towards a tab 119 (e.g., a detent) within the channel 113. The tab 119 may be separate from or coupled to the projection 117. As shown, the tab 119 and the projection 117 are elements of a common member (e.g., a finger).

Figure 9:
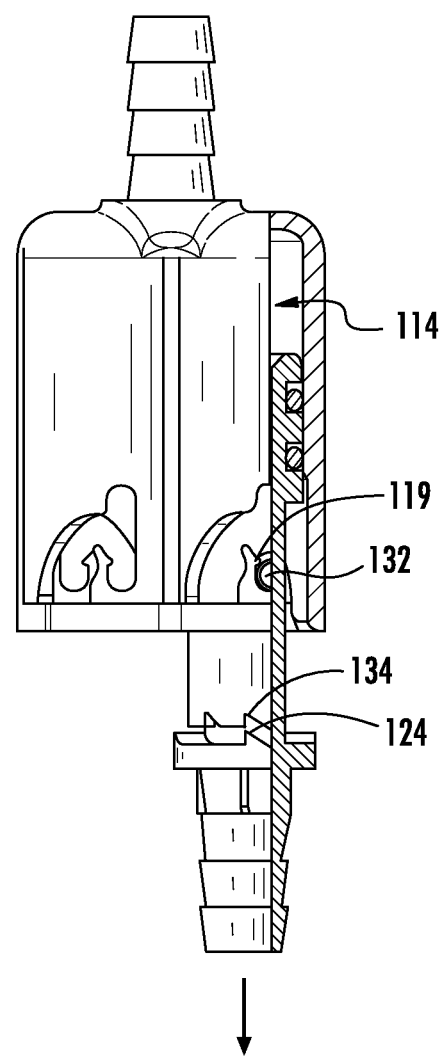
FIG. 9 is a cross-sectional view of an exemplary embodiment of the quick connector assembly of FIG. 1 showing a hose fitting in a locked position within a quick connector.

The tab 119 can provide an opening within the channel 113 that is slightly smaller than a diameter or width of the projection 132 so that a force must be applied to pull the projection past the tab 119 and into a locked position. For example, the tab 119 can be flexible and can elastically deform once a sufficient force has been applied to permit the projection 132 to move past the tab 119 and into a locked position, as shown in FIG. 9. After the projection 132 has been moved into the locked position, the tab 119 may engage a surface of the projection 132 to resist movement of the projection past the tab 119 to begin disconnecting the lock tab 130 and the hose fitting 120 from the quick connector 110, thus maintaining the lock tab 130, and thus the hose fitting 120 connected to the lock tab 130, in a locked state with the quick connector 110. Once the projection 132 has been pulled past the tab 119, an audible click may be produced to alert a user that the projection 132 and lock tab 130 have been located into the locked position.

Although the lock tab 130 is locked in position, a hose fitting 120 connected to the lock tab 130 may be free to rotate relative to the lock tab 130, as shown in the example of FIG. 9, by pulling the hose fitting 120 slightly downwards to disengage the lugs 124 of the hose fitting 120 from the notches 134 of the lock tab 130 so that a gap 135 is provided between the lugs 124 and the notches 134. The hose fitting 120 can be prevented from moving downwards to completely disengage from the lock tab 130 and the quick connector 110, such as by providing the hose fitting with a shoulder 126 to engage with the end of the lock tab 130.

Once the hose fitting 120 and the hose lock tab 130 have been positioned in a locked position, such as in FIG. 9, the hose lock tab 130 can be prevented from rotating or otherwise resist rotating relative to the quick connector 110. For example, because the projection 132 of the hose lock tab 130 is located in the locked position within the channel 113 with sidewalls forming the channel 113 on both sides of the projection 132, as shown in FIG. 9, the projection 132 can be prevented from rotating or rotating to a substantial degree, such as in a left or right direction in FIG. 9. In addition, the projection and the hose lock tab 130 are prevented from moving downwards to further extract the hose lock tab 130 from the quick connector 110.

Figure 10:
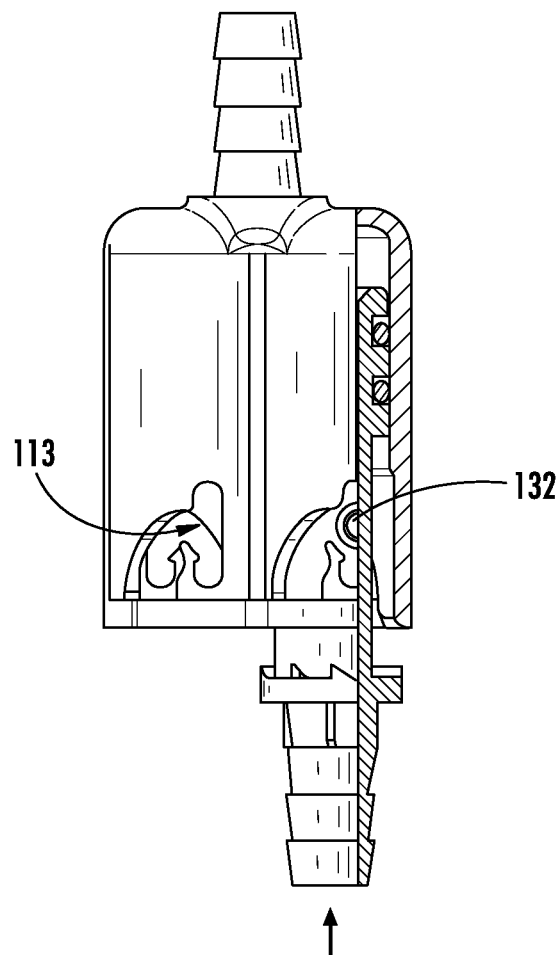
FIG. 10 is a cross-sectional view of an exemplary embodiment of the quick connector assembly of FIG. 1 after a hose fitting has been initially inserted into a quick connector to disconnect the hose fitting from the quick connector.
Figure 11:
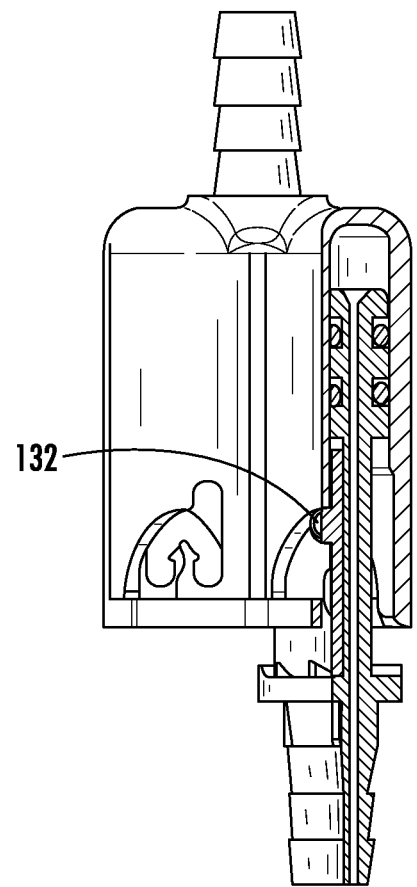
FIG. 11 is a cross-sectional view of an exemplary embodiment of the quick connector assembly of FIG. 1 after initially rotating the hose fitting relative to a quick connector to disconnect the hose fitting.
Figure 12:
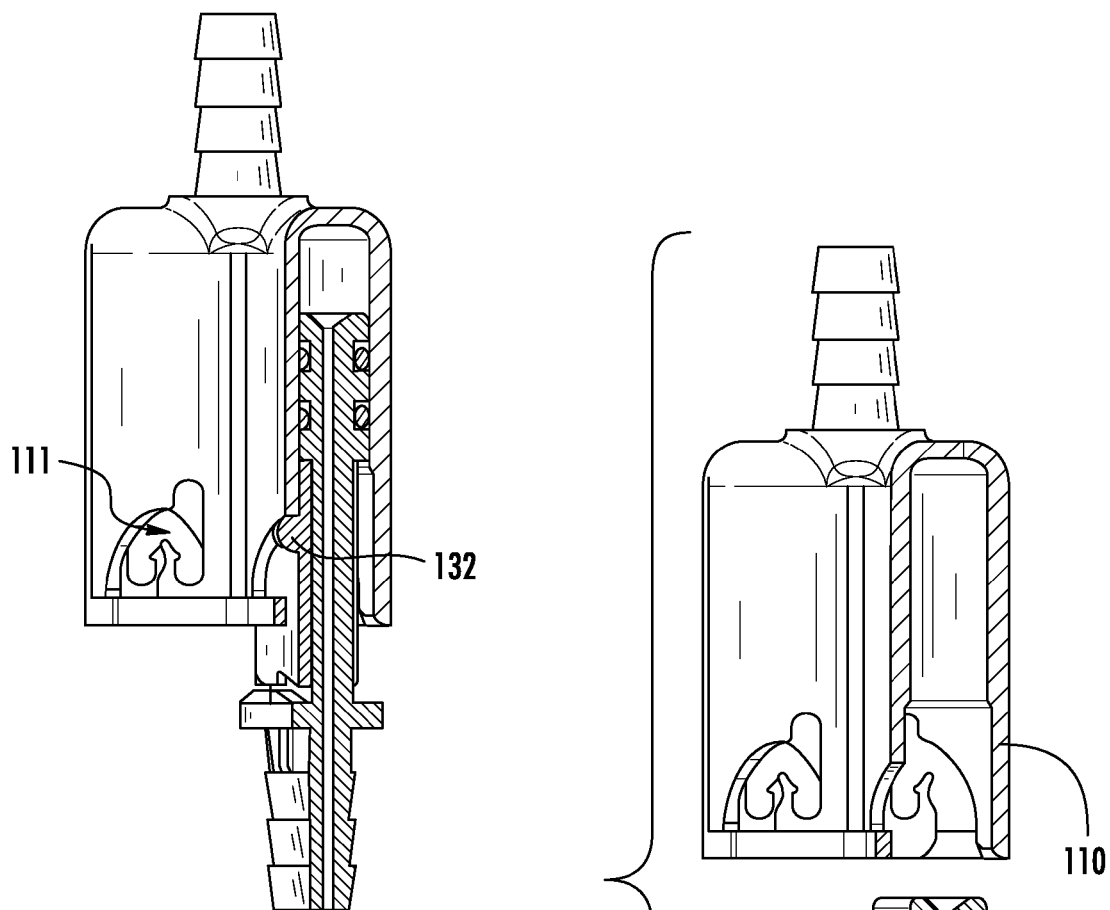
FIG. 12 is a cross-sectional view of an exemplary embodiment of the quick connector assembly of FIG. 1 after the hose fitting has been fully rotated relative to the quick connector to disconnect the hose fitting.
Figure 13:
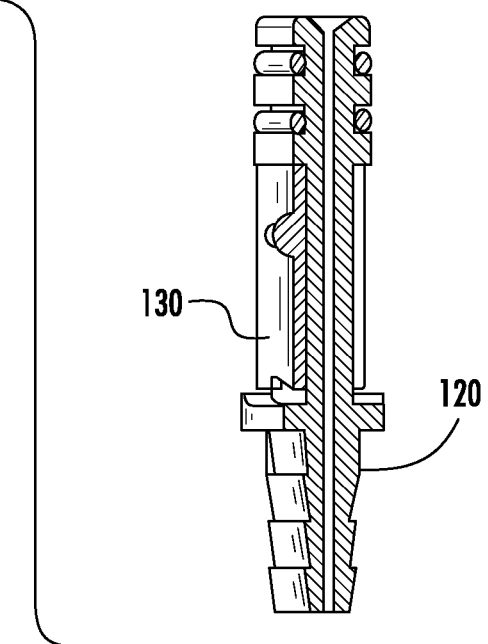
FIG. 13 is a cross-sectional view of an exemplary embodiment of the quick connector assembly of FIG. 1 after the hose fitting has been withdrawn from the quick connector to fully disconnect the hose fitting from the quick connector.

Should a user wish to disconnect a hose fitting 120 from the quick connector 110, the user may reverse the movements discussed above. As shown in FIG. 10, the hose fitting 120 and the hose lock tab 130 may first be pushed upwards to force the projection 132 of the hose lock tab 130 past the tab 119 to unlock the hose lock tab 130. Because of the detent-like structure of the tab 119, a sufficient amount of pressure will be required to force the projection 132 past the tab 119. At the same time, the lugs 124 of the hose fitting 120 will be pushed upward to engage the notches 134 of the lock tab 130. The lock tab 130 and the hose fitting 120 can then be rotated to force the projection 132 through the gate portion 111, as shown in FIGS. 11 and 12 (the ratcheting feature provided by the interaction between the lugs 124 and the notches 134 is intended to aid in removing the hose, since the free rotation of the hose relative to the lock tab will be arrested by the engagement between the lugs 124 and the notches 134, allowing the user to provide torque during the rotation and disassembly process). Once the projection 132 has been rotated and forced back through the gate portion 111, the hose lock tab 130 and the hose fitting 120 may then be pulled downwards to disengage the projection 132 from the slot 115 and remove the hose lock tab 130 and the hose fitting 120 from the quick connector 110.

By providing the quick connector 110 and the lock tab 130 with connection structures, such as the slot 115 and the projection 132, a simple connection can be provided that reliably forms a seal between a hose fitting 120 connected to the lock tab 130 and the quick connector 110. For example, once the lock tab 130 is positioned in the locked position, as shown in FIG. 9, an end of the hose fitting 120 inserted into the cavity 114 of the quick connector 110 can form a seal with a wall of the quick connector 110 forming the cavity 114. In addition, the connection structures can minimize or prevent an unintentional disconnection.

The connection structures need not use threads to screw together the lock tab 130 and the quick connector 110, as in conventional devices. As a result, the quick connector assembly 100 does not have a torque installation feature, which is intended to prevent or minimize the possibility of a user over-tightening a connection, such as between the lock tab 130 and the quick connector 110. In addition, the components of the quick connector assembly 100 need not be made from machined metal parts and can instead be made from a polymeric material and fewer overall parts can be used, thus reducing the cost to manufacture the assembly.

Figure 14A:
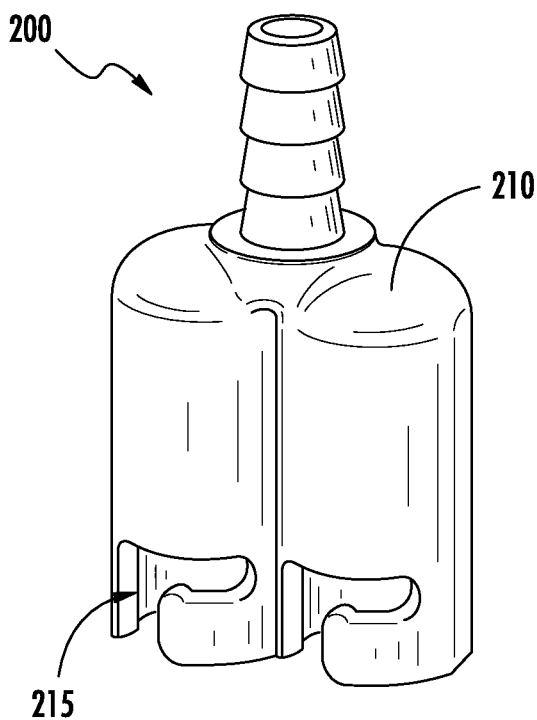
FIG. 14A is a perspective view of another exemplary embodiment of a quick connector.
Figure 14B:
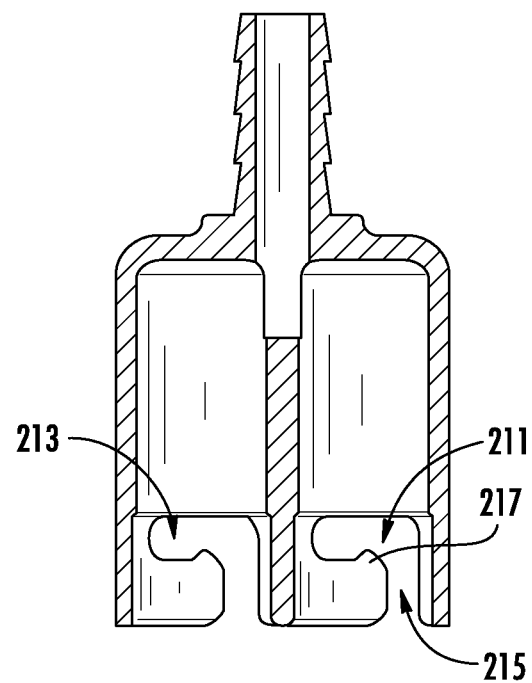
FIG. 14B is a cross-section view of the quick connector assembly of FIG. 14A.

FIG. 14A is a perspective view of another embodiment of an exemplary quick connector assembly 200 for a faucet, which includes a quick connector or tee 210. The quick connector assembly 200 shown in the embodiment of FIG. 14A has a slot 215 that is substantially in the shape of the letter "L." Such a slot 215 can be provided to engage with the projection of a hose lock tab (not shown), such as by inserting the projection of the hose lock tab into the slot 215. The slot 215 can further include a gate portion 211, which can be an opening for the projection of the hose lock tab to enter.

As shown in FIG. 14A, the gate portion 211 can be formed by a projection 217. Such a projection 217 can form a gate portion 211 that requires a force to be exerted so that the projection of the hose lock tab may pass through the gate portion 211, such as by providing a gate portion 211 with an opening that is slightly smaller than a diameter or width of the projection of the hose lock tab. For example, as discussed herein, the projection 217 can be formed by a relatively narrow tab having a degree of flexibility so that the projection 217 will elastically deform and permit a projection of a hose lock tab to pass through the gate portion 211 and into a receiving area 213 once a sufficient force has been applied. The gate portion 211 can also serve as an anti-backout feature which resists uninstalling a hose fitting from the quick connector 210 by resisting movement of the projection of a hose lock tab through the gate portion 211 in a reverse direction after the projection of the hose lock tab has passed through the gate portion 211 to be installed.

Figure 15A:
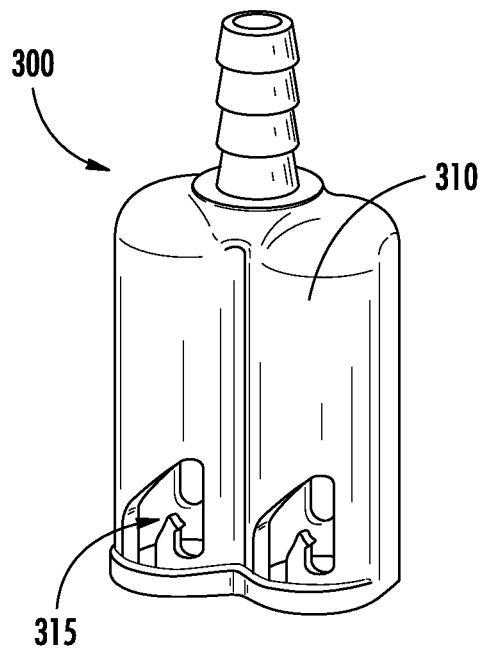
FIG. 15A is a perspective view of another exemplary embodiment of a quick connector.

FIG. 15A is a perspective view of another embodiment of an exemplary quick connector assembly 300 for a faucet which includes a quick connector or tee 310. The quick connector assembly 300 has a slot 315 which can be provided to engage with the projection of a hose lock tab (not shown), such as by inserting the projection of the hose lock tab into the slot 315. The slot 315 can further include a gate portion 311, which can be an opening for the projection of the hose lock tab to enter. As shown in the embodiment of FIGS. 15A and 15B, the slot 315 can have a shape such that the gate portion 311 is located at a pronounced upper end of the slot 315.

Figure 15B:
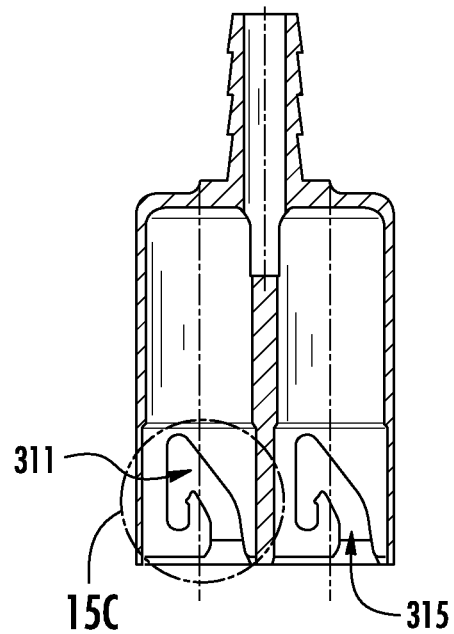
FIG. 15B is a cross-section view of the quick connector of FIG. 15A.
Figure 15C:
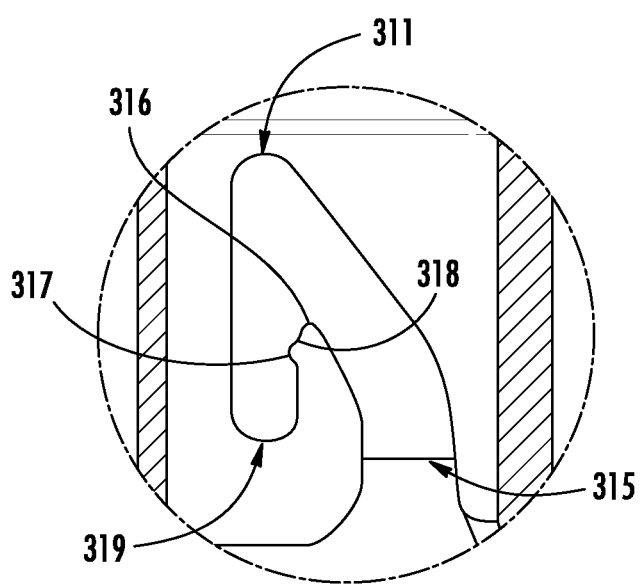
FIG. 15C is an enlarged view of area A of FIG. 15B.

As shown in FIG. 15C, which is an enlarged view of area 15C of FIG. 15B, the gate portion 311 can be formed by a projection 316. Such a projection 316 can form a gate portion 311 that requires a force to be exerted so that the projection of the hose lock tab may pass through the gate portion 311, such as by providing a gate portion 311 with an opening that is slightly smaller than a diameter or width of the projection of the hose lock tab. For example, as discussed herein, the projection 316 can be formed by a relatively narrow tab having a degree of flexibility so that the projection 316 will elastically deform and permit a projection of a hose lock tab to pass through the gate portion 311 once a sufficient force has been applied.

The embodiment shown in FIG. 15C can include a second projection 317 to separate the gate portion 311 from a receiving portion 319 for a projection of a hose lock tab. An indentation or recess 318 can be provided between projection 316 and the second projection 317, such as to separate the projections 316, 317. The second projection 317 can require a force to be exerted so that the projection of the hose lock tab may pass by the second projection 317 and into the receiving portion 319, such as by providing a gate portion 311 in the area of the second projection 317 with an opening that is slightly smaller than a diameter or width of the projection of the hose lock tab. For example, as discussed herein, the second projection 317 can be formed by a relatively narrow tab having a degree of flexibility so that the second projection 317 will elastically deform and permit a projection of a hose lock tab to pass by the second projection 317 once a sufficient force has been applied.

Figure 16:
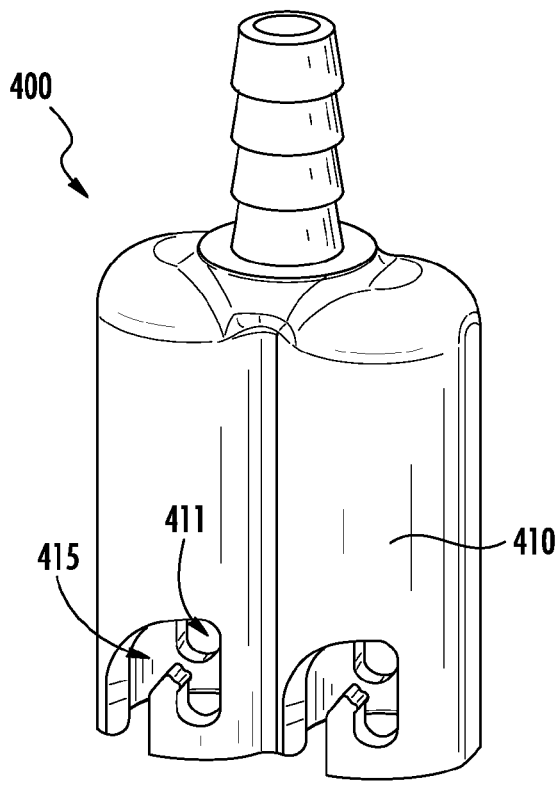
FIG. 16 is a perspective view of another exemplary embodiment of a quick connector.

FIG. 16 is a perspective view of another embodiment of an exemplary quick connector assembly 400 for a faucet which includes a quick connector or tee 410 with a slot 415. As shown in the example of FIG. 16, the slot 415 can be configured similarly to that shown in FIGS. 15A-15C, including first and second projections within the slot, but can have a less pronounced shape such that the slot 415 has more of a shape of an upside-down letter "U." For example, such a shape of a slot can be used to provide a more pronounced locking feeling when a hose lock tab (not shown) is pushed and pulled to lock the hose lock tab in place relative to the tee 410 of the quick connector assembly.

Figure 17A:
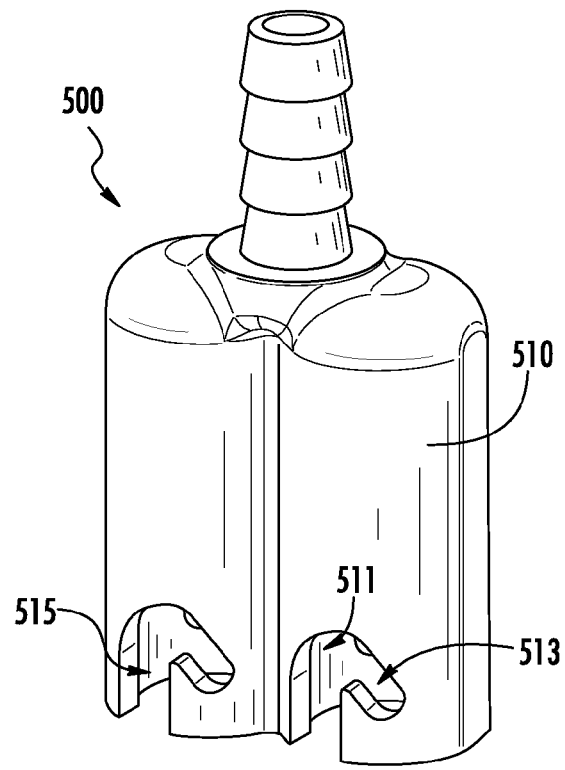
FIG. 17A is a perspective view of another exemplary embodiment of a quick connector.

FIG. 17A is a perspective view of another embodiment of an exemplary quick connector assembly 500 for a faucet which includes a quick connector or tee 510 with a slot 515. As shown in the example of FIG. 17A, the slot 515 can have an angled shape with the final receiving portion 513 being angled downward relative to a remainder of the slot 515. For example, as shown in FIG. 17A, the slot 515 can include a gate portion 511 which is located at a relatively higher position in the tee 510 than the final receiving portion 513 for a projection of a hose lock tab (not shown in FIG. 17A).

Figure 17B:
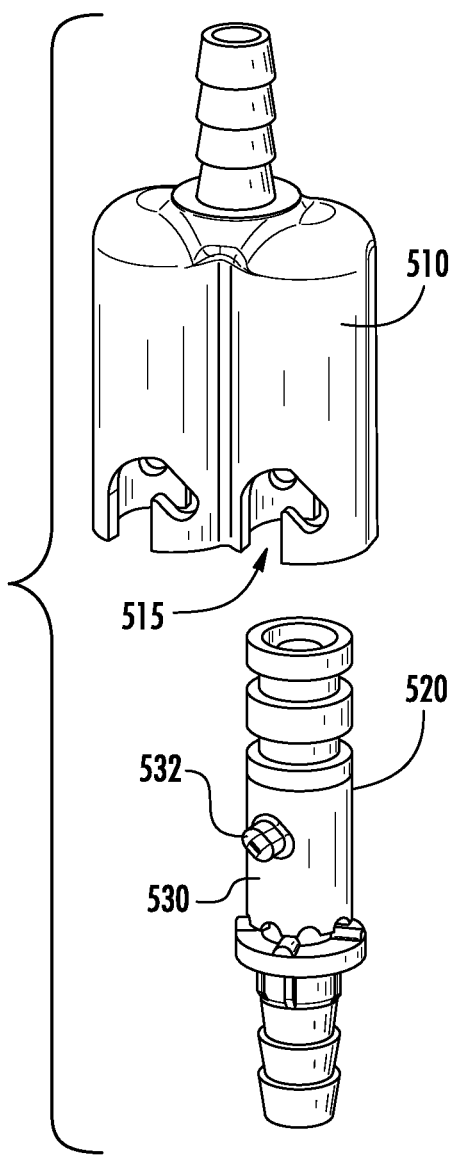
FIG. 17B is a perspective view of the quick connector of FIG. 17A with a hose connector.
Figure 17C:
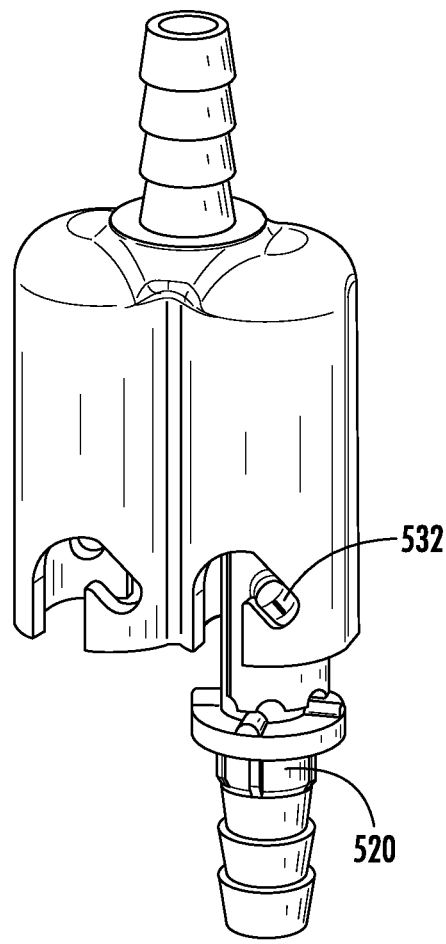
FIG. 17C is a perspective view of the quick connector and hose connector of FIG. 17B in an assembled state.

FIG. 17B shows the tee 510 of FIG. 17A and a hose connector 520 to be connected to the tee 510. The hose connector 520 further includes a hose lock tab 530, as discussed herein, having a projection 532 which can engage with the slot 515 of the tee 510. FIG. 17C shows the hose connector 520 and tee 510 in a locked state after the hose connector 520 has been pushed upwards so that the projection 532 enters and engages walls of the tee 510 forming the slot 515 until the projection 532 reaches the gate portion 511 in the upper end of the slot 515. After this, the hose connector 520 is turned and pulled downwards so that the projection 532 then enters the receiving portion 513 and the quick connector assembly 500 is provided in a locked state.

Figure 18A:
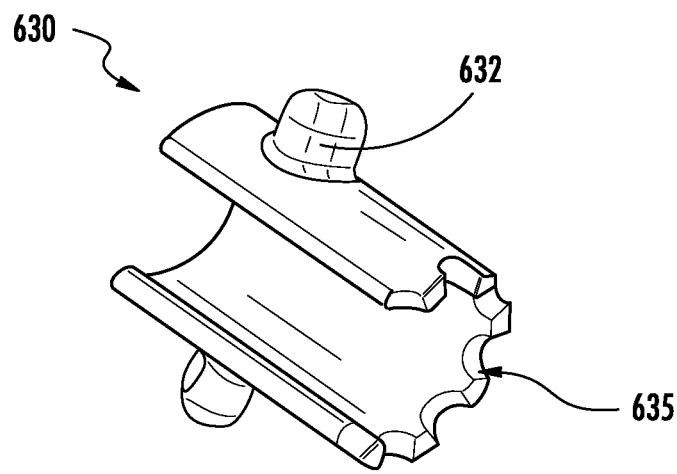
FIG. 18A is a perspective view of another exemplary embodiment of a hose lock tab.
Figure 18B:
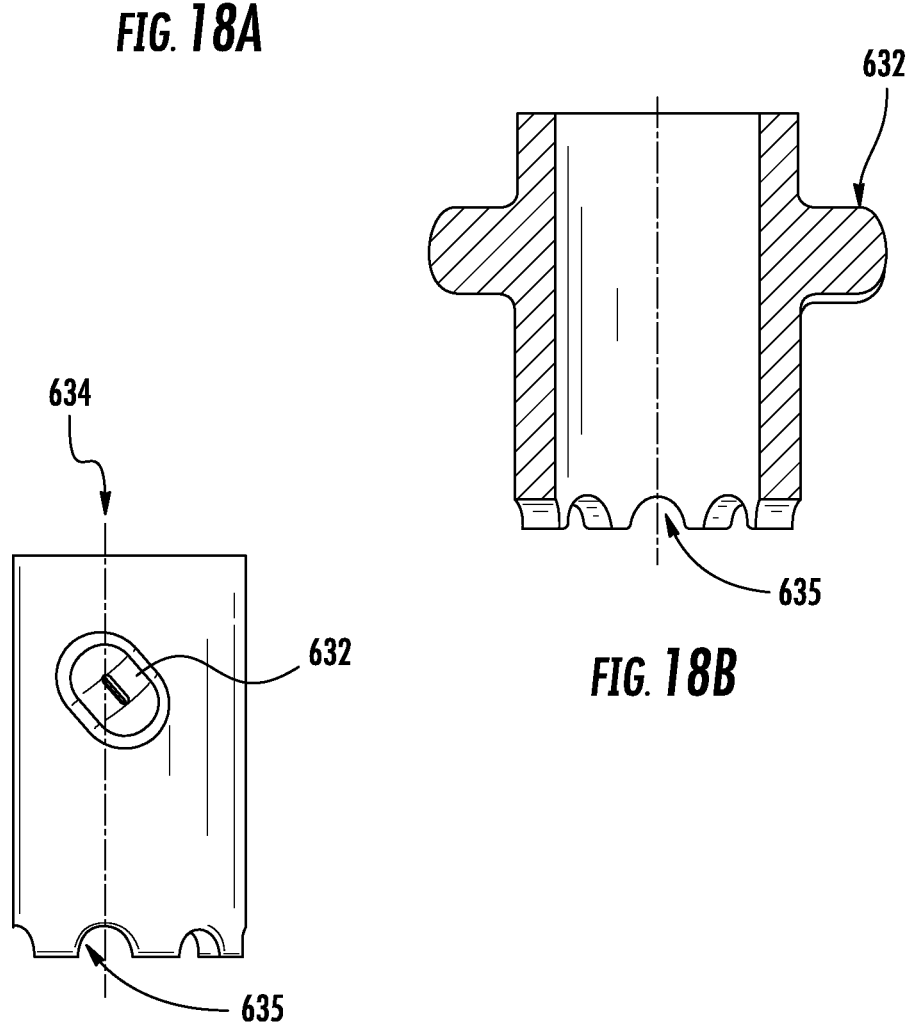
FIG. 18B is a cross-section view of the hose lock tab of FIG. 18A.
Figure 18C:
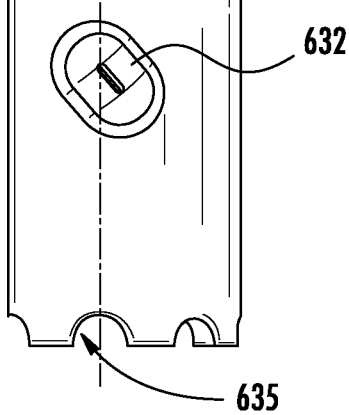
FIG. 18C is a side view of the hose lock tab of FIG. 18A.
Figure 19:
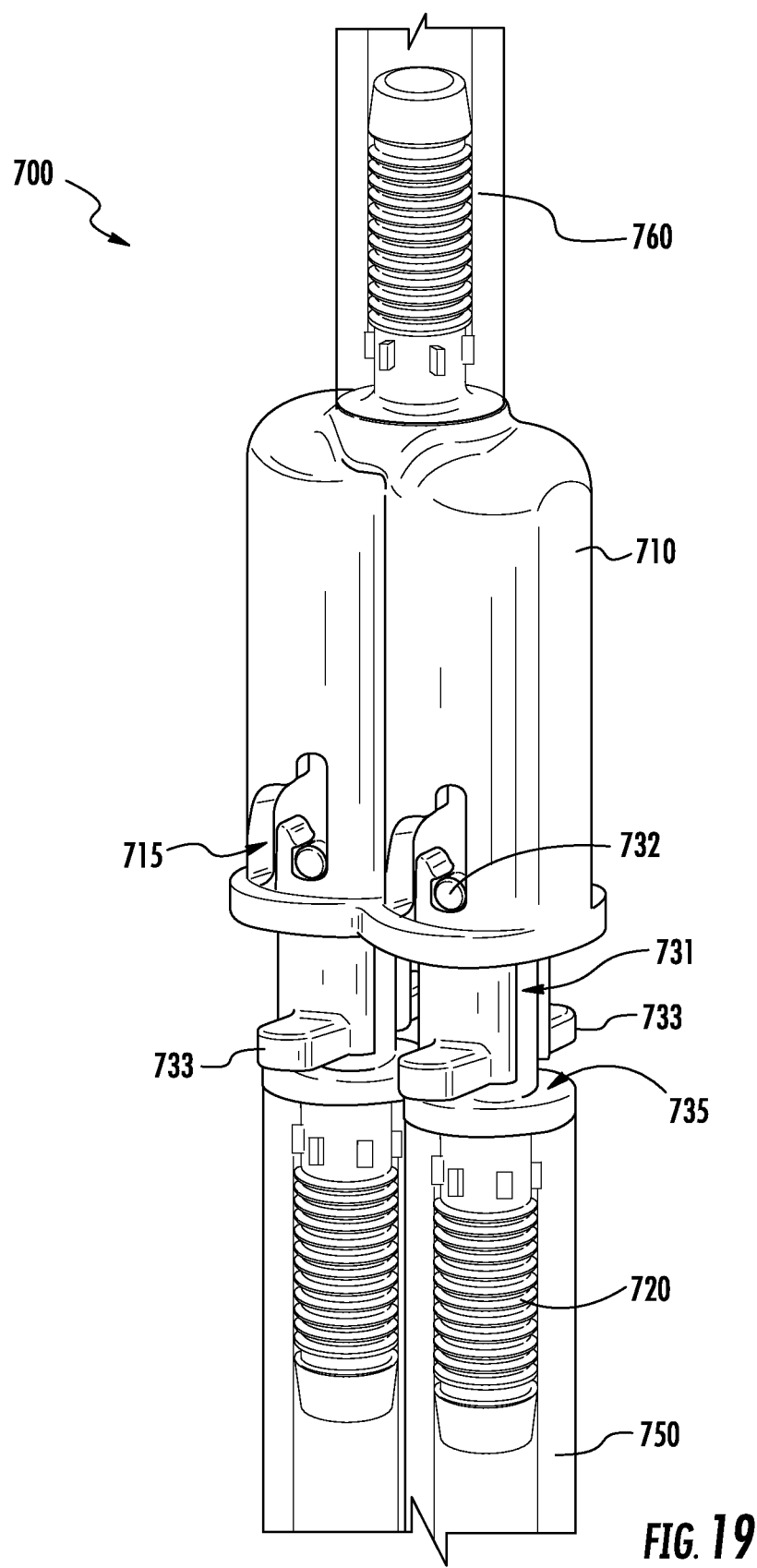
FIG. 19 is perspective view of another exemplary embodiment of a quick connector assembly with attached hoses shown transparently.
Figure 21:
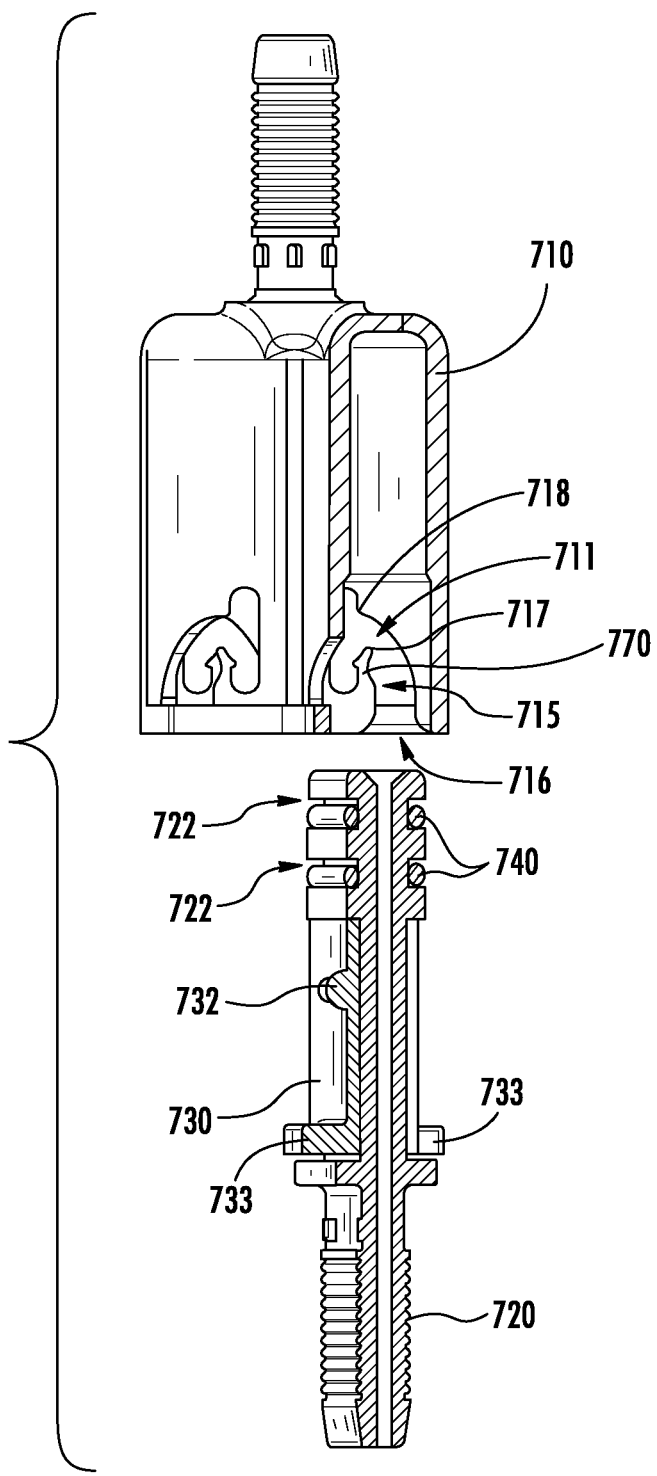
FIG. 21 is a cross-sectional view of an exemplary embodiment of the quick connector assembly of FIG. 19 before a hose fitting has been inserted into a quick connector.
Figure 22:
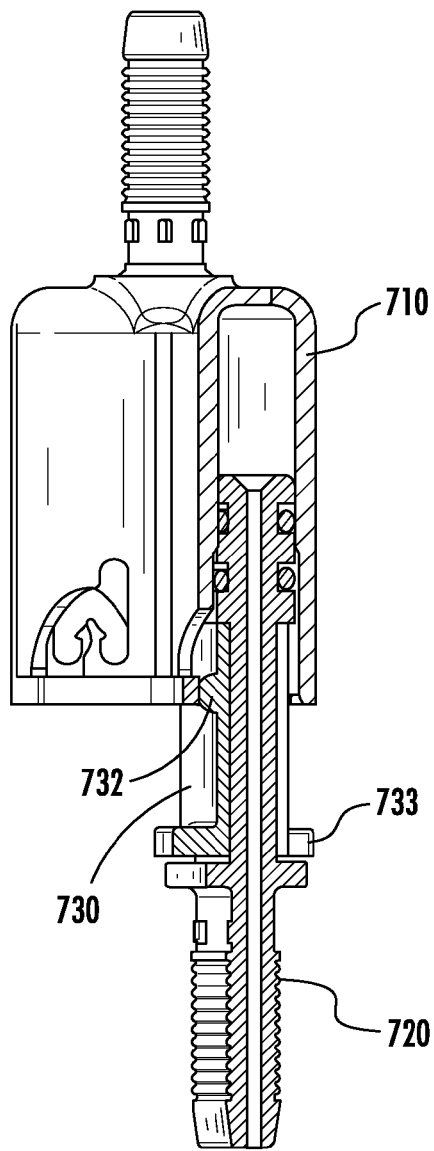
FIG. 22 is a cross-sectional view of an exemplary embodiment of the quick connector assembly of FIG. 19 after a hose fitting has been initially inserted into a quick connector.
Figure 23:
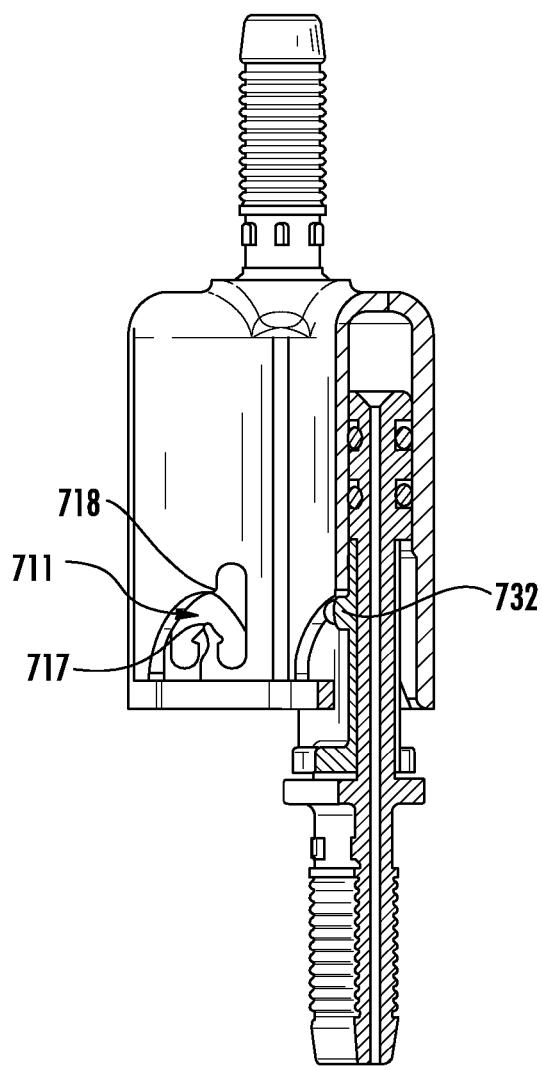
FIG. 23 is a cross-sectional view of an exemplary embodiment of the quick connector assembly of FIG. 19 after a hose fitting has been further inserted into a quick connector.
Figure 26:
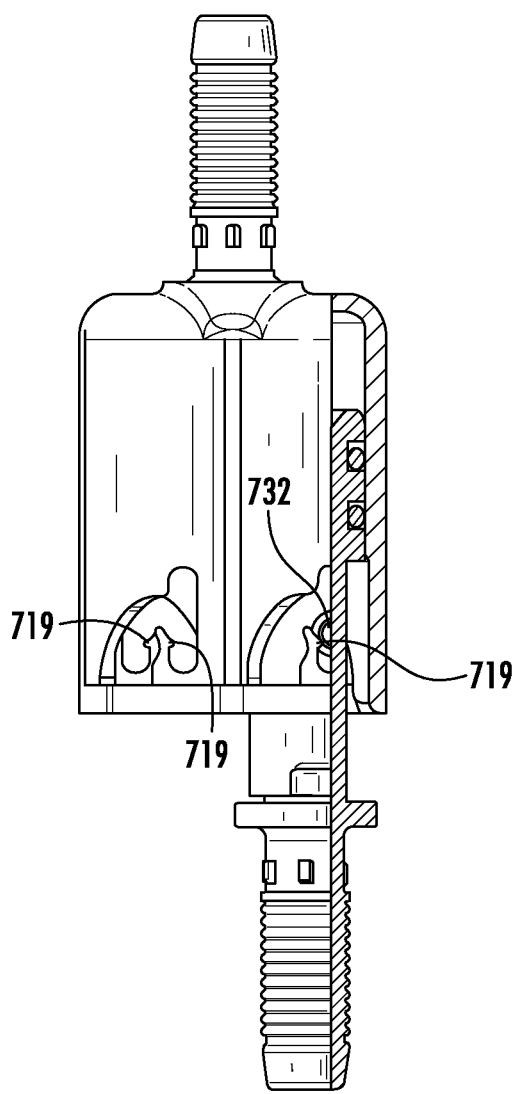
FIG. 26 is a cross-sectional view of an exemplary embodiment of the quick connector assembly of FIG. 19 after a hose fitting has been partially retracted from the quick connector towards a lock position.

FIG. 18A is a perspective view of a hose lock tab 630, which includes one or more projections 632 to engage with the slot of a tee (not shown). As shown in the example of FIG. 18C, which is a side view of the hose lock tab 630 of FIG. 18A, the projection 632 can be angled relative to the hose lock tab 630, such as by providing the projection 632 at an angle relative to the vertical or longitudinal axis 634 of the hose lock tab 630. The hose lock tab 630 can further include a series of notches or recesses 635 in a bottom end of the hose lock tab 630. Such notches or recesses 635 can be provided to engage with projections of a hose connector (not shown) to assist in the rotational movement of the hose lock tab 630 when the hose connector 620 is rotated. Such notches or recesses 635 can have a rounded shape, as shown in the example of FIGS. 18A-18C, instead of an angled shape, as shown in the examples of FIGS. 3-13.

Figure 27:
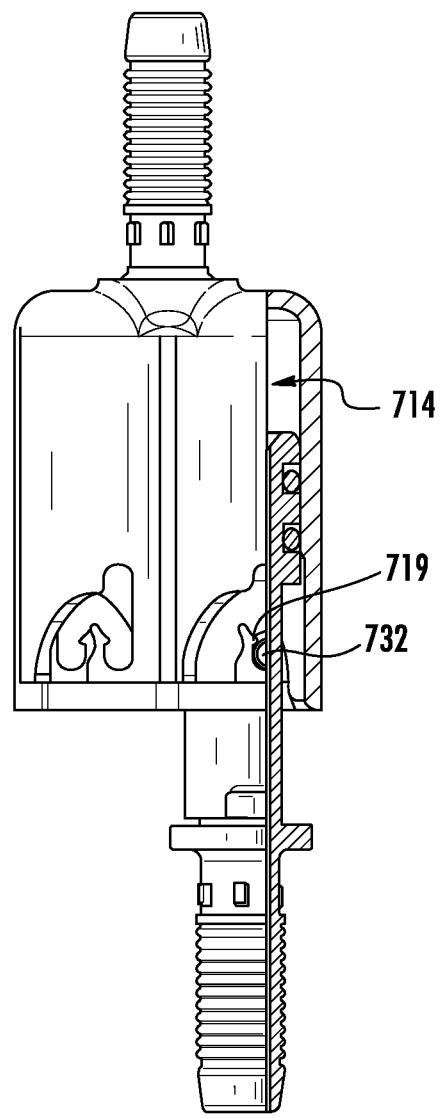
FIG. 27 is a cross-sectional view of an exemplary embodiment of the quick connector assembly of FIG. 19 showing a hose fitting in a locked position within a quick connector.
Figure 28:
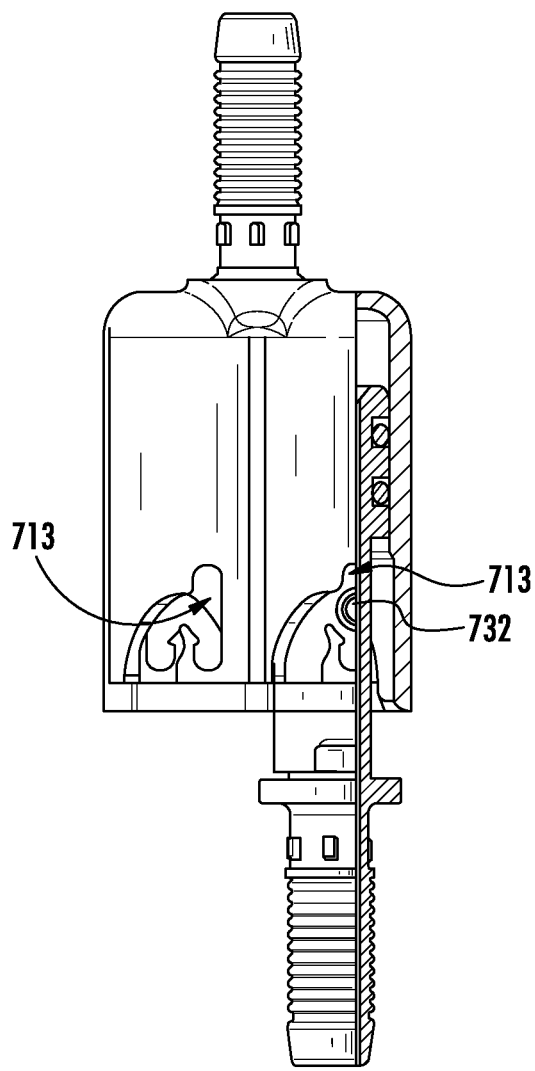
FIG. 28 is a cross-sectional view of an exemplary embodiment of the quick connector assembly of FIG. 19 after a hose fitting has been initially inserted into a quick connector to disconnect the hose fitting from the quick connector.
Figure 29:
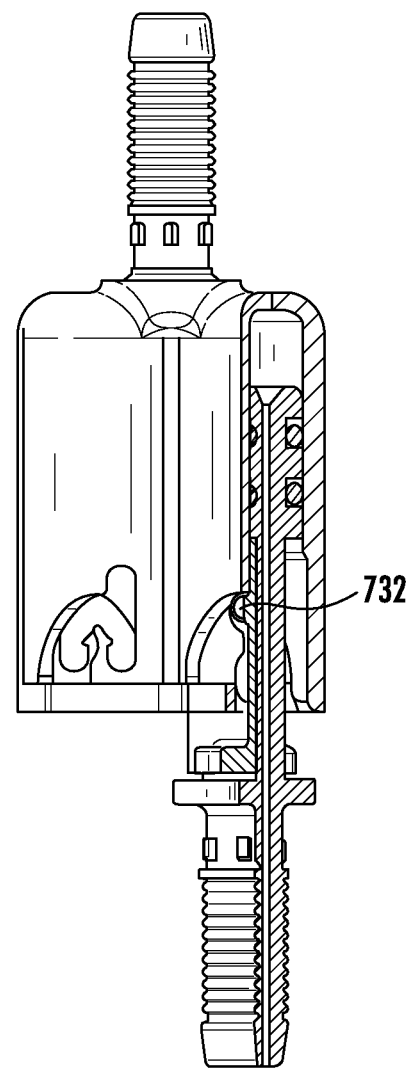
FIG. 29 is a cross-sectional view of an exemplary embodiment of the quick connector assembly of FIG. 19 after initially rotating the hose fitting relative to a quick connector to disconnect the hose fitting.
Figure 30:
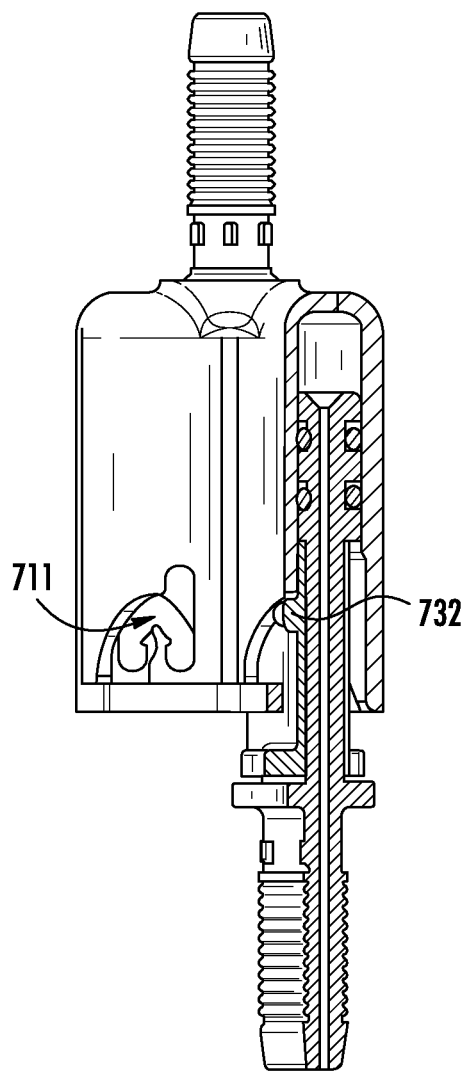
FIG. 30 is a cross-sectional view of an exemplary embodiment of the quick connector assembly of FIG. 19 after the hose fitting has been fully rotated relative to the quick connector to disconnect the hose fitting.
Figure 31:
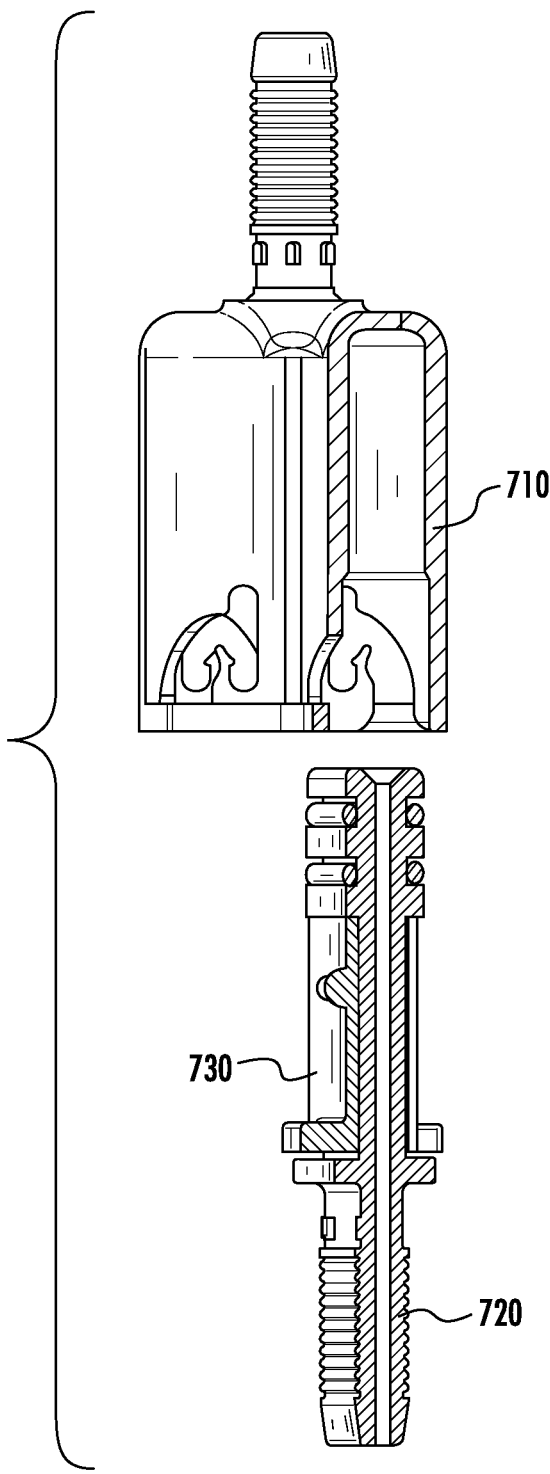
FIG. 31 is a cross-sectional view of an exemplary embodiment of the quick connector assembly of FIG. 19 after the hose fitting has been withdrawn from the quick connector to fully disconnect the hose fitting from the quick connector.
Figure 32:
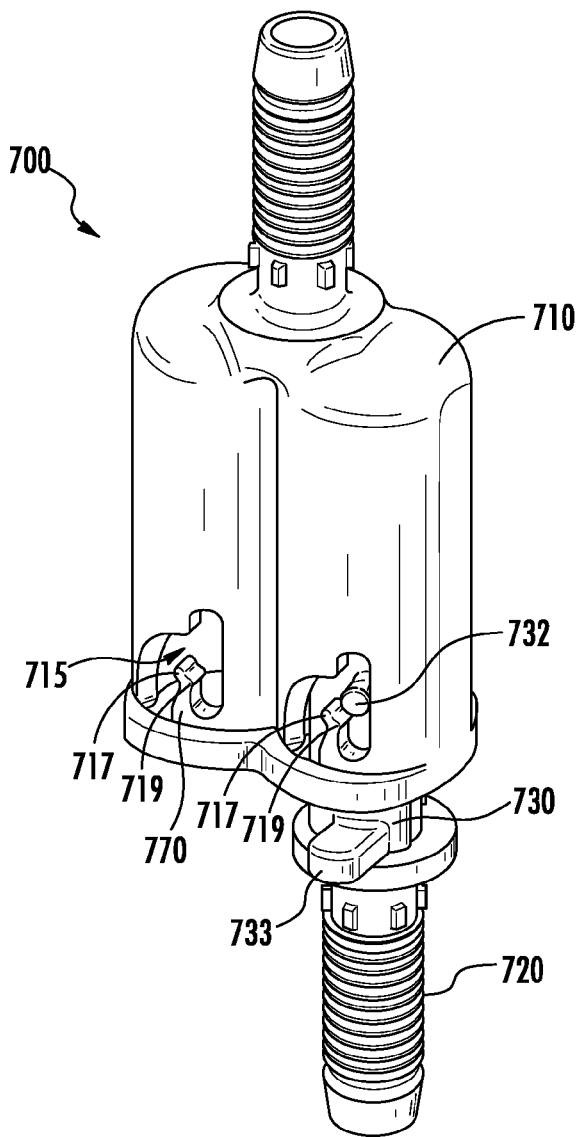
FIG. 32 is a perspective view of the quick connector assembly and hose connector of FIG. 19 in a partially assembled state similar to the cross-sectional view of FIG. 26.
Figure 33:
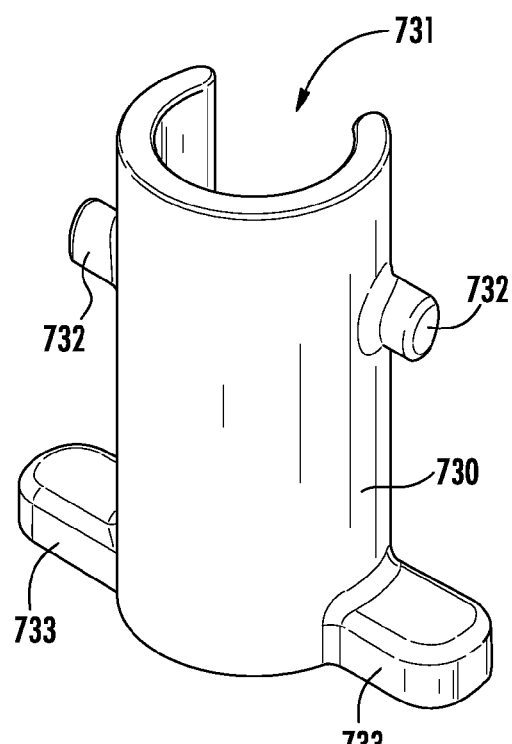
FIG. 33 is a perspective view of the hose lock tab of FIG. 19.

FIGS. 19-33 show another embodiment of an exemplary quick connector assembly 700 for a faucet. A person of skill in the art will recognize the similarities between quick connector assembly 700 and quick connector assembly 100, with like reference numerals referring to like features. For example, the quick connector assembly 700 includes a quick connector 710 (e.g., tee, connector body, etc.), which includes a fitting, such as a barbed fitting 712, which connects to the hose 760. According to various embodiments, the hose 760 may supply water from the connector assembly 700 to the faucet outlet or may supply water to the connector assembly 700. The quick connector 710 includes a slot 715 extending from an opening 716 to a locked position (i.e., the location of the projection 732 in FIG. 27). The slot 715 further includes a gate portion 711 and a channel 713. The gate portion 711 includes projections 717 and 718. A tab 719 forms a detent to releasably retain the projection 732 in the locked position. The projection 717 and the tab 719 are shown to be on opposite sides of an elastically deflectable finger 770.

The quick connector assembly 700 further includes a hose connector or fitting 720, which connects to a hose 750, and a lock device or lock tab 730. According to various embodiments, the hose 750 may supply water to the connector assembly 700 or may supply water from the connector assembly 700 to the faucet outlet. The lock tab 730 includes an axially elongated gap 731 through which the hose fitting 720 may be installed in to the lock tab 730. A shoulder 726 on the hose fitting 720 engages an end of the lock tab 730 and axially retains the hose fitting 720 therein in a first, downward, or disconnected direction.

The lock tab 730 includes at least one radially outwardly extending handle or lug 733. The lug 733 facilitates a user's grasp and manipulation of the lock tab 730. For example, the lug 733 provides a handle with which the user may apply axial forces to perform a push-pull movement for connecting (or disconnecting) the hose fitting 720/lock tab 730 subassembly to (or from) the quick connector 710. The radially extending lug 733 increases the length of a moment arm, thereby reducing the rotational force applied by the user to generate sufficient torque to pass the projection 732 through the gate portion 711. Reducing the necessary rotational force allows a user to use finer motor skills, which reduce the chance of over-tightening and/or damage to the components of the quick connector assembly 700. Further, as shown in FIG. 20A, the lug 733 may be the radially outward-most extending component of the quick connector assembly 700 from the longitudinal axis of the hose fitting 720 and lock tab 730 through at least the directions of the sweep of connecting rotation. That is, the connector body 710 about a second longitudinal axis of a second hose fitting 720 and second lock tab 730 may technically be further radially from the first longitudinal axis, but it is not in the direction that the lug 733 would extend during the installation process (i.e., as the projection 732 travels through the slot 715). Accordingly, the lug 733 may facilitate a user's grasp thereof and provide tactile feedback to the user. For example, the radial extension of the lug 733 may reduce the possibility of the user's grasp of the lug 733 being dislodged by another component (e.g., a flange on the quick connector 710 or hose fitting 720) during the connection of the hose fitting 720/lock tab 730 subassembly to the quick connector 710. For another example, in use, the quick connector assembly may be obscured from view by plumbing or other components (e.g., a food waste disposer), and the radial extension of the lug 733 may enable to find and grasp the lug 733 by feel, thereby enabling the user to disconnect the lock tab 730 from the quick connector 710 without visual cues.

As shown, the quick connector assembly 700 does not include a ratchet system similar to that of notch 134 and lug 124 in the quick connector assembly 100. Accordingly, the gap 735 between the bottom of the lock tab 730 and a flange of the hose fitting 720 may be reduced, for example, to a sliding fit, because the relative axial movement between the hose fitting 720 and the lock tab 730 is not necessary to engage and disengage notches and lugs. According to another embodiment, a quick connector assembly may include both the radially outwardly extending lugs 733 of the quick connector assembly 700 and the notches 134 and lugs 124 of the quick connector assembly 100. In such an embodiment, the user may have the option of which force transfer mechanism to use.

The quick connector assembly can be configured such that hoses supplying hot and cold water may be connected after the quick connector assembly has been connected to a faucet or the faucet has otherwise been installed. This permits the quick connector assembly to be assembled to valves and tested at the factory, reducing the chance of leaks at a connection. In addition, the components described herein can be used with any low pressure low connection or connector, not only widespread tee connections or quick connector.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

References herein to the positions of elements (e.g., "top," "bottom," "above," "below," etc.) are merely used to describe the orientation of various elements in the FIGURES. It should be noted that the orientation of various elements may differ according to other examples, and that such variations are intended to be encompassed by the present disclosure.

It is important to note that the construction and arrangement of the devices shown in the various examples is illustrative only. Although only a few examples have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative examples. Other substitutions, modifications, changes and omissions may also be made in the design, operating conditions and arrangement of the various examples without departing from the scope of the present invention.

What is claimed is:

1. A quick connector assembly for a faucet, comprising:
a hose fitting having a longitudinal axis;
a lock tab removably coupled to the hose fitting when the hose fitting is not coupled to a connector body, the lock tab having at least one projection extending radially therefrom; and
the connector body having at least one slot extending from an opening to a locked position, the at least one slot configured to receive the at least one projection of the lock tab;
wherein when the lock tab is coupled to the hose fitting, moving the at least one projection of the lock tab from the opening of the at least one slot to the locked position connects the lock tab and the hose fitting to the connector body;
wherein the lock tab at least partially circumscribes the hose fitting and defines a longitudinal gap for the passage of the hose fitting therethrough.

2. The assembly of claim 1, wherein moving the projection of the lock tab from the opening of the at least one slot to the locked position causes the lock tab to rotate about the longitudinal axis relative to the connector body.

3. The assembly of claim 1, wherein the lock tab is rotatably coupled to the hose fitting.

4. The assembly of claim 1, wherein the hose fitting comprises a shoulder that engages the lock tab to prevent decoupling of hose fitting from the connector body.

5. The assembly of claim 1, wherein the connector body at least partially defines a first cavity configured to receive the locking tab.

6. The assembly of claim 5, wherein the connector body at least partially defines a second cavity configured to receive a second locking tab, the second locking tab coupled to a second hose fitting.

7. The assembly of claim 1, wherein the at least one slot has a hook shape.

8. The assembly of claim 7, wherein the hook shape of the at least one slot transforms axial forces upon the lock tab into rotational movement of the lock tab relative to the connector body.

9. The assembly of claim 1, wherein the at least one slot comprises a detent configured to releasably retain the at least one projection in the locked position.

10. The assembly of claim 9, wherein the detent audibly alerts a user when the at least one projection passes thereby.

11. A quick connector assembly for a faucet, comprising:
 a lock tab coupled to a hose fitting, the lock tab having:
  a longitudinal axis; and
  at least one projection extending radially from the lock tab; and
 a connector body having at least one slot extending from an opening to a locked position, the at least one slot having a gate portion which resists the passage of the at least one projection therethrough configured to receive the at least one projection of the lock tab;
 wherein the lock tab is rotatable about the longitudinal axis, relative to the hose fitting, when the lock tab is coupled thereto;
 wherein moving the at least one projection of the lock tab from the opening of the at least one slot to the locked position connects the lock tab to the connector body;
 wherein the connector body at least partially defines a first cavity configured to receive the locking tab;
 wherein the connector body at least partially defines a second cavity configured to receive a second locking tab, the second locking tab coupled to a second hose fitting.

12. The assembly of claim 11, wherein the gate portion comprises a portion of the at least one slot having a width that is less than a diameter of the at least one projection.

13. The assembly of claim 11, wherein the gate portion comprises a finger which elastically deforms to permit passage of the at least one projection thereby when sufficient force is applied to the lock tab.

14. The assembly of claim 13, wherein the finger comprises a tab which engages a surface of the at least one projection to resist disconnection of the lock tab from the connector body.

15. A faucet, comprising:
 a quick connector assembly, including:
  a hose fitting having a longitudinal axis;
  a lock tab including a substantially cylindrical body, the body having a longitudinal wall opening configured to receive the hose fitting therein and at least one projection extending radially therefrom; and
  a connector body having at least one slot extending from an opening to a locked position, the at least one slot configured to receive the at least one projection of the lock tab;
 wherein moving the at least one projection of the lock tab from the opening of the at least one slot to the locked position connects the lock tab to the connector body.

16. The faucet of claim 15, wherein when the at least one projection is in the at least one slot, the at least one projection extends through the connector body to permit visual inspection of the location of the at least one projection.

17. The faucet of claim 15, wherein the lock tab comprises a radially outwardly extending handle configured to facilitate a user's grasp and manipulation of the lock tab.

18. The faucet of claim 17, wherein the outwardly extending handle is the radially outward-most extending component of the quick connector assembly in at least the radial directions of the arc swept by the handle as the projection travels through the at least one slot.

19. The faucet of claim 15, wherein one of the lock tab and the hose fitting comprises a lug, and the other of the lock tab and the hose fitting comprises a notch configured to receive the lug and to transmit rotational forces therebetween, and wherein the hose fitting is axially moveable relative to the lock tab such that the lug may space apart from the notch to permit the hose fitting to rotate relative to the connector body when the lock tab is in the locked position and such that the lug may couple to the notch to permit the hose fitting to transmit rotational forces through the lock tab to the at least one projection.

* * * * *